(12) United States Patent
Yang et al.

(10) Patent No.: US 12,354,379 B2
(45) Date of Patent: Jul. 8, 2025

(54) IMAGE TO WORLD SPACE TRANSFORMATION FOR GROUND-TRUTH GENERATION IN AUTONOMOUS SYSTEMS AND APPLICATIONS

(71) Applicant: NVIDIA Corporation, Santa Clara, CA (US)

(72) Inventors: Zongyi Yang, Eatontown, NJ (US); Mariusz Bojarski, Lincroft, NJ (US); Bernhard Firner, Highland Park, NJ (US)

(73) Assignee: NVIDIA Corporation, Santa Clara, CA (US)

( * ) Notice: Subject to any disclaimer, the term of this patent is extended or adjusted under 35 U.S.C. 154(b) by 664 days.

(21) Appl. No.: 17/696,083

(22) Filed: Mar. 16, 2022

(65) Prior Publication Data

US 2023/0298361 A1   Sep. 21, 2023

(51) Int. Cl.
*G06V 20/00* (2022.01)
*G06T 7/73* (2017.01)
(Continued)

(52) U.S. Cl.
CPC .............. *G06V 20/588* (2022.01); *G06T 7/73* (2017.01); *G06V 10/774* (2022.01); *G06V 10/82* (2022.01);
(Continued)

(58) Field of Classification Search
CPC .... G06V 20/588; G06V 10/774; G06V 10/82; G06V 10/945; G06V 10/7753;
(Continued)

(56) References Cited

U.S. PATENT DOCUMENTS 10,885,698 B2   1/2021  Muthler et al.
2019/0259176 A1*  8/2019  Dai ........................... G06T 7/73
(Continued)

OTHER PUBLICATIONS

IEC 61508, "Functional Safety of Electrical/Electronic/Programmable Electronic Safety-related Systems," Retrieved from Internet URL: https://en.wikipedia.org/wiki/IEC_61508, accessed on Apr. 1, 2022, 7 pages.

(Continued)

*Primary Examiner* — Van D Huynh
(74) *Attorney, Agent, or Firm* — Taylor Duma L.L.P.

(57) ABSTRACT

In various examples, image space coordinates of an image from a video may be labeled, projected to determine 3D vehicle space coordinates, then transformed to 3D world space coordinates using known 3D world space coordinates and relative positioning between the coordinate spaces. For example, 3D vehicle space coordinates may be temporally correlated with known 3D world space coordinates measured while capturing the video. The known 3D world space coordinates and known relative positioning between the coordinate spaces may be used to offset or otherwise define a transform for the 3D vehicle space coordinates to world space. Resultant 3D world space coordinates may be used for one or more labeled frames to generate ground truth data. For example, 3D world space coordinates for left and right lane lines from multiple frames may be used to define lane lines for any given frame.

20 Claims, 14 Drawing Sheets

(51) Int. Cl.
  *G06V 10/774* (2022.01)
  *G06V 10/82* (2022.01)
  *G06V 10/94* (2022.01)
  *G06V 20/56* (2022.01)

(52) U.S. Cl.
  CPC .. *G06V 10/945* (2022.01); *G06T 2207/20081* (2013.01); *G06T 2207/20084* (2013.01); *G06T 2207/20092* (2013.01); *G06T 2207/30241* (2013.01); *G06T 2207/30256* (2013.01)

(58) Field of Classification Search
  CPC ............. G06T 7/73; G06T 2207/20081; G06T 2207/20084; G06T 2207/20092; G06T 2207/30241; G06T 2207/30256; G06T 3/00
  See application file for complete search history.

(56) References Cited

U.S. PATENT DOCUMENTS

| | | | | |
|---|---|---|---|---|
| 2019/0384303 | A1* | 12/2019 | Muller | G06N 20/00 |
| 2020/0109954 | A1* | 4/2020 | Li | G01C 21/3848 |
| 2020/0324795 | A1* | 10/2020 | Bojarski | G06V 10/764 |
| 2021/0042535 | A1* | 2/2021 | Abbott | G06V 20/588 |
| 2021/0201145 | A1* | 7/2021 | Pham | G06N 3/08 |
| 2021/0241005 | A1* | 8/2021 | Abbott | G06V 20/588 |
| 2021/0312203 | A1* | 10/2021 | Patzwaldt | G06V 10/24 |
| 2022/0108552 | A1* | 4/2022 | Chi | G06F 18/25 |

OTHER PUBLICATIONS

ISO 26262, "Road vehicle—Functional safety," International standard for functional safety of electronic system, Retrieved from Internet URL: https://en.wikipedia.org/wiki/ISO_26262, accessed on Sep. 13, 2021, 8 pages.

"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201609, pp. 1-30 (Sep. 30, 2016).

"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201806, pp. 1-35 (Jun. 15, 2018).

* cited by examiner

IMAGE TO WORLD SPACE TRANSFORMATION FOR GROUND-TRUTH GENERATION IN AUTONOMOUS SYSTEMS AND APPLICATIONS

BACKGROUND

In testing and training neural networks for automotive applications it is useful to have ground truth labels of the desired driving trajectory and lane lines. In training, it is possible to either directly train on these labels or train on data derived from these labels. For example, the lane center can be derived as the center of the left and right lane line trajectories and be used as a training label. In testing, the ground truth can be used to evaluate network performance by comparing the network output to the ground truth to measure inference error, or in augmented replay of the collected data the lane line trajectories can be used to determine when the simulated car has crossed lane boundaries.

Conventionally, ground truth labels may be generated from video frames captured by a camera mounted to a vehicle traveling a route in the environment. Using a conventional approach to labeling ground truth, video frames from the camera are presented to a human labeler as two-dimensional (2D) images. The human labeler interacts with each presented video frame to mark lane lines on each 2D image by positioning polylines or selecting pixels along the entire lane lines depicted in the 2D image. This is a time consuming and slow process, requiring substantial human interaction with an interface used for labeling (e.g., extensive user inputs such as clicks, mouse movement, screen updates, etc.). As such, the conventional approach to labeling ground truth may skip frames to reduce the labeling burden, thereby reducing the quantity and quality of labeled ground truth data. Additionally, in various scenarios it may be desirable for ground truth labels to include 3D world space positions. Deriving the 3D world space positions from the 2D image coordinates may require computationally expensive per-frame processing of Light Detection and Ranging (LIDAR) data to fuse the LIDAR data with the 2D image frames.

SUMMARY

Embodiments of the present disclosure relate to image to world space transformation from image labels for ground-truth generation. More specifically, the current disclosure relates to improved systems for identifying lane lines or boundaries in real world space, and providing a ground truth trajectory for a vehicle.

In contrast to conventional approaches, such as those describe above, one or more sets of image space coordinates of an image captured using one or more sensors on a vehicle may be labeled, projected to determine a set(s) of 3D vehicle space coordinates, then transformed to a set(s) of 3D world space coordinates using a corresponding set(s) of known 3D world space coordinates and relative positioning between the coordinate spaces. For example, the system may include one or more known sets of 3D world space coordinates and corresponding orientations associated with the vehicle (corresponding to a pose of the vehicle), such as vehicle trajectory information, over time. The set of 3D vehicle space coordinates may be temporally correlated with a set(s) of known 3D world space coordinates. Based on the temporal correlation, the set of known 3D world space coordinates (and in some embodiments the corresponding pose) and known relative positioning between the coordinate spaces may be used to offset or otherwise define a transform for the set of 3D vehicle space coordinates to world space. The system may apply the transform and use resultant set(s) of 3D world space coordinates for one or more labeled frames, to generate ground truth data. For example, sets of 3D world space coordinates for left and right lane lines from multiple frames may be used to define lane lines for any given frame.

BRIEF DESCRIPTION OF THE DRAWINGS

The present systems and methods for image to world space transformation from image labels for ground-truth generation are described in detail below with reference to the attached drawing figures, wherein.

DETAILED DESCRIPTION

Figure 1:
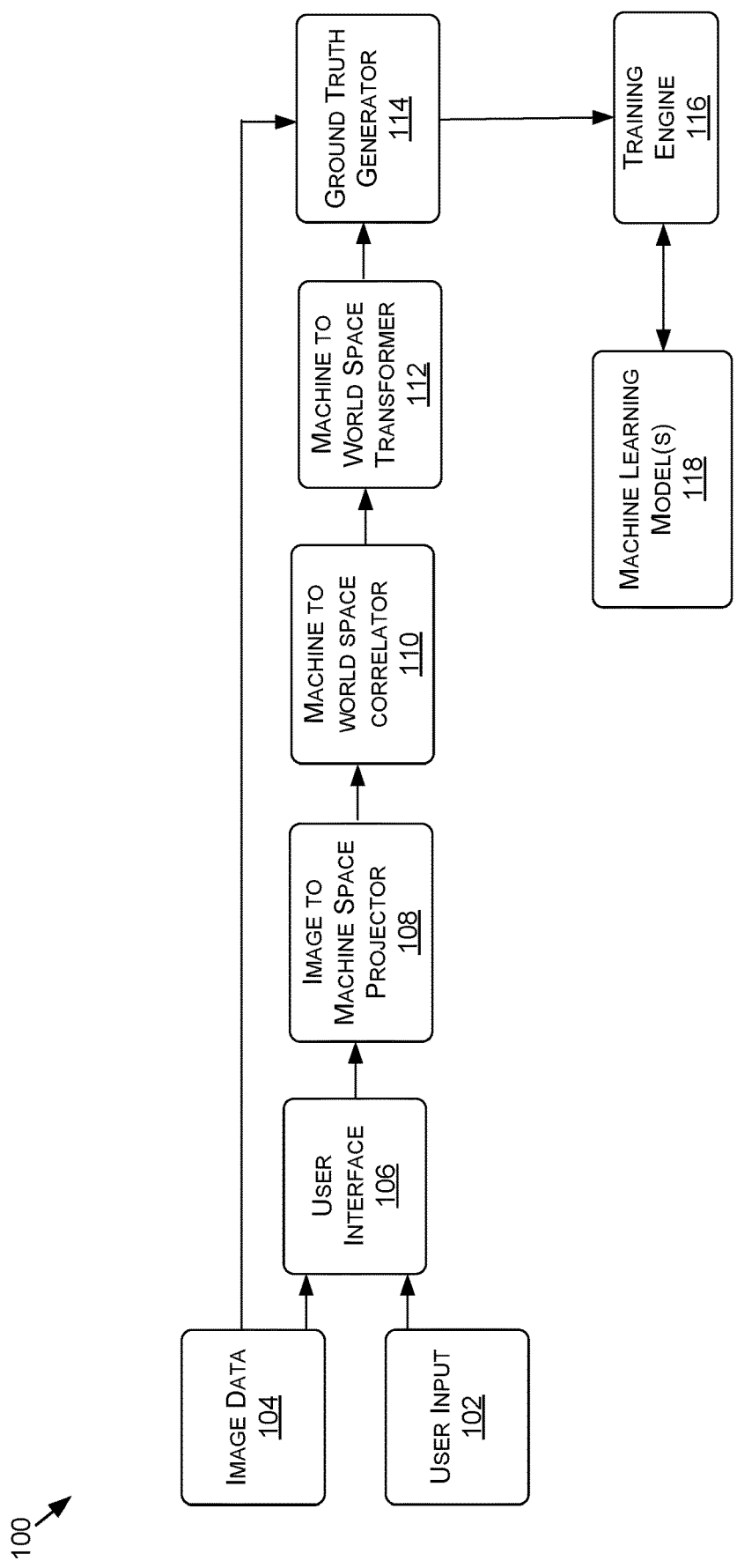
FIG. 1 is an example process flow of a lane labeling system, in accordance with some embodiments of the present disclosure.

Systems and methods are disclosed related to image to world space transformation from image labels for ground-truth generation. The present disclosure relates to training and testing neural networks for use with autonomous vehicles. More specifically, the current disclosure relates to improved systems for identifying lane lines or boundaries in real world space, and providing a ground truth trajectory for a vehicle. Although the present disclosure may be described with respect to an example autonomous vehicle 700 (alternatively referred to herein as "vehicle 700" or "ego-vehicle 700," an example of which is described with respect to FIGS. 7A-7D), this is not intended to be limiting. For example, the systems and methods described herein may be used by, without limitation, non-autonomous vehicles, semi-autonomous vehicles (e.g., in one or more adaptive driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. In addition, although the present disclosure may be described with respect to autonomous driving, this is not intended to be limiting, and the systems and methods described herein may be used in augmented reality, virtual reality, mixed reality, robotics, security, and surveillance, autonomous or semi-autonomous machine applications, and/or any other technology spaces where machine learning may be used. Disclosed approaches may be implemented in or using at least a portion of one or more of a control system for an autonomous or semi-autonomous machine, a perception system for an autonomous or semi-autonomous machine, a system for performing simulation operations, a system for performing deep learning operations, a system implemented using an edge device, a system implemented using a robot, a system incorporating one or more virtual machines (VMs), a system implemented at least partially in a data center, or a system implemented at least partially using cloud computing resources. Further, although the present disclosure is primarily described using examples of sensors in the form of cameras, disclosed techniques may be used with any suitable form of sensor.

In contrast to conventional approaches, such as those describe above, one or more sets of image space coordinates of an image captured using one or more sensors on a vehicle may be labeled, projected to determine a set(s) of 3D vehicle space coordinates (e.g., based on a camera space), then transformed to a set(s) of 3D world space coordinates using a corresponding set(s) of known 3D world space coordinates and relative positioning between the coordinate spaces. For example, the system may include one or more known sets of 3D world space coordinates and corresponding orientations associated with the vehicle (corresponding to a pose of the vehicle), such as vehicle trajectory information, over time. The set of 3D vehicle space coordinates may be temporally correlated with a set(s) of known 3D world space coordinates. Based on the temporal correlation, the set of known 3D world space coordinates (and in some embodiments the corresponding pose) and known relative positioning between the coordinate spaces may be used to offset or otherwise define a transform for the set of 3D vehicle space coordinates to world space. The system may apply the transform and use resultant set(s) of 3D world space coordinates for one or more labeled frames, to generate ground truth data. For example, sets of 3D world space coordinates for left and right lane lines from multiple frames may be used to define lane lines for any given frame.

In one or more embodiments, 2D images from a sensor, such as a forward-facing camera mounted to a vehicle, can be presented to a labeler (e.g., in a user interface). The labeler may only need to determine and mark one or more points (sets of image space coordinates) on one or more images (e.g., using an input device such as a mouse). In some cases, to aid a labeler, a guiding line or other shape is provided (e.g., overlaying the image), so the labeler only needs to decide where to place one or more points along the guiding line (e.g., removing an axis of selection for efficiency). The guiding line can be a horizontal line or a curved line that intersects one or more displayed lane boundaries, if present. The guiding line may be displayed (in image space) as intersecting a point in the road that is a short distance in front of the vehicle (in world space). For example, the guiding line on an image may be configured to indicate a location on the road approximately two to six meters in front of the vehicle. Other distances can be used, but a distance within a certain proximity to the vehicle may increase the likelihood that the ground that includes the selected one or more lane boundaries is substantially flat. This may simplify projecting the image space coordinates to vehicle space, as the height of the coordinates in vehicle space may be constant for each image (e.g., a 0 height in the vehicle space or offset by a known amount).

In some cases, no guiding line is provided, and a labeler selects one or more points to indicate one or more lane boundaries. For a front-facing camera, the points may typically be in the lower third of the image, but above the hood if present. In embodiments where a ground-facing camera is used, a labeler can label one or more points indicating lane boundaries directly beneath the vehicle, for example. A labeler may be able to label one or more points on images that represent a sampling of frames of video, such as every ten frames of video or may select samples from every frame. Further the labeler may be a human labeler or a machine labeler. In some cases, a human may review one or more points selected by a machine for one or more images. In at least one embodiment, the machine may determine and/or predict the one or more points using corresponding one or more points of a previous frame. For example, the previous points may have been selected by a human labeler. The system may search for the new points in regions defined based on proximities to the previous points (e.g., a box around each point) or may otherwise extrapolate the points to a subsequent frame. In one or more embodiments, the system may indicate previously-selected points from a prior frame and/or points determined for the current frame, allowing the user to confirm and/or adjust the points for the subsequent frame.

As described herein, points may be labeled in 2D space based on images from a camera affixed to a vehicle. The labels may indicate one or more lane lines or boundaries in the images, such as the left and right lane boundaries (or boundaries of other, outer or inner lanes). The points may be used, in combination with a known position and orientation of the vehicle, to project the selected points into vehicle space. The vehicle space projection may be based on the properties of the sensor(s) used to capture the image and in some embodiments the position (and/or pose) of the sensor(s) relative to one or more points on the vehicle. For example, the relative positioning may be known for the coordinate space with respect to a rear axle of the vehicle, which may define an origin of the vehicle space. The position may be used to offset an inverse projection from 2D image to 3D camera-space which assumes the selected points are on a flat ground relative to the vehicle and may leverage intrinsic parameters that define the field of view of the camera, such as sensor height and width and the effective vertical and horizontal field of view corresponding to the image.

In at least one embodiment, the known sets of 3D world space coordinates (used to transform sets of vehicle space coordinates into 3D world space coordinates) and corresponding orientations may be measured (e.g., derived through measurement). For example, while capturing images used for labeling, an internal inertial measurement unit (IMU) and/or other measurement devices may be used to determine the known sets of 3D world space coordinates and corresponding orientations using corresponding measurements of the environment. In some implementations, other data besides IMU data may be used to determine the real-world trajectory traveled by the vehicle. For example, a global positioning system (GPS) may be used to determine the location and a compass may be used to determine the direction or orientation of the vehicle. At least some of the data regarding the vehicle's real-world trajectory, as well as the images, may be timestamped or otherwise include metadata indicating temporal relationships between images and trajectory data (e.g., 3D world space coordinates and orientation). Thus, the trajectory data may be temporally correlated with the images (e.g., during or after capture time).

In one or more embodiments, the known relative positioning between the coordinate spaces may be defined with respect to the vehicle. For example, the relative positioning may be known for each coordinate space with respect to a rear axle of the vehicle, which may be useful in embodiments where the IMU is used to determine trajectory information relative to the rear axle. By way of example and not limitation, a point on the rear-axle at time t=0 in the trajectory may correspond to the origin of the world space coordinate system (0, 0, 0). The distance from the point to the sensor(s) (or other position used to define the origin of vehicle space) may also be known in 3D-world space. For example, the vertical and horizontal distances from the rear axle of the vehicle to any camera or other sensor can be known. In other cases, the data may correspond to another location and/or component of the vehicle with a known position relative to any sensors, such as one or more cameras.

In one or more embodiments, to transform the set(s) of 3D vehicle space coordinates to world space, the sets of 3D vehicle space coordinates corresponding to left and right lane boundaries the system may determine (e.g., lookup) the nearest known set(s) of 3D world space coordinates in space-time using the known relative positions, pose, and temporal relationship (e.g., timestamps). The set of 3D world space coordinates may define the offset used to transform the sets of 3D vehicle space coordinates to world space. In at least one embodiment, the coordinate spaces may be defined such that the known set of 3D world space coordinates may be added to each set of 3D world space coordinates to result in the corresponding 3D world space coordinates.

The system may the use the resultant set(s) of 3D world space coordinates for one or more labeled frames, to generate ground truth data. For example, sets of 3D world space coordinates for left and right lane lines from multiple frames may be used to define lane lines for any given frame. One or more additional points may be determined using interpolation. This provides ground truth lane lines, which can be used to teach or evaluate machine learning models. The sets of 3D world space coordinates may additionally or alternatively be used to determine ground truth for other locations and/or objects, such as a centerline between the lane lines based at least on averaging or otherwise aggregating left and right sets of 3D world space coordinates. The ground truth centerline can be used as a desired or intended trajectory for an autonomous vehicle.

The systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, autonomous or semi-autonomous machine applications, deep learning, environment simulation, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for multi-dimensional (e.g., 3D) assets, systems implemented at least partially using cloud computing resources, and/or other types of systems.

With reference to FIG. 1, FIG. 1 is an example process flow 100 of a lane labeling system, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

As an overview, user input 102 may indicate one or more selections on a user interface 106, which may identify, specify, and/or provide coordinates associated with one or more images represented by the image data 104. A machine or human labeler may provide the user input 102 for the image data 104, which may represent one or more video frames from video taken by a camera associated with a vehicle (e.g., the vehicle 700 of FIG. 7A). For example, a labeler may select one or more lane boundary locations in an image. In at least one embodiment, the selection includes a confirmation of predicted or suggested lane boundaries. An image to machine space projector 108 may project the coordinates of the identified lane boundaries to a machine space. The machine space, such as a machine space 304 of FIG. 3, can be correlated to a world space, such as a world space 404 of FIG. 4 using a machine to world space correlator 110. The coordinates in the machine space can be transformed by a machine to world space transformer 112 to the world space based on the correlation. The transformed information can be used by a ground truth generator 114, along with the image data 104, to determine ground truth information, such as 3D world space coordinates of ground truth lane boundaries along the path traveled by the vehicle 700 during generation of the image data 104.

As shown in the process flow 100 in FIG. 1, the user input 102 and the image data 104 are received in the user interface 106. The user interface 106 can correspond to a first user interface display 202, shown in FIG. 2A. The user interface 106 can include a screen or other display for presenting the image data 104 to human labelers, for example, in order to receive the user input 102 via the user interface 106. The user input 102 can include a selection or indication of one or more locations within an image represented by the image data 104, and each location can correspond to or provide a set of coordinates associated with the image data 104 (As used herein, a set may include one or more elements). In embodiments, the user input 102 corresponds to selection of one or more points on a line, such as guideline 270 in FIG. 2C, overlaid on the image in the user interface 106.

Figure 2A:
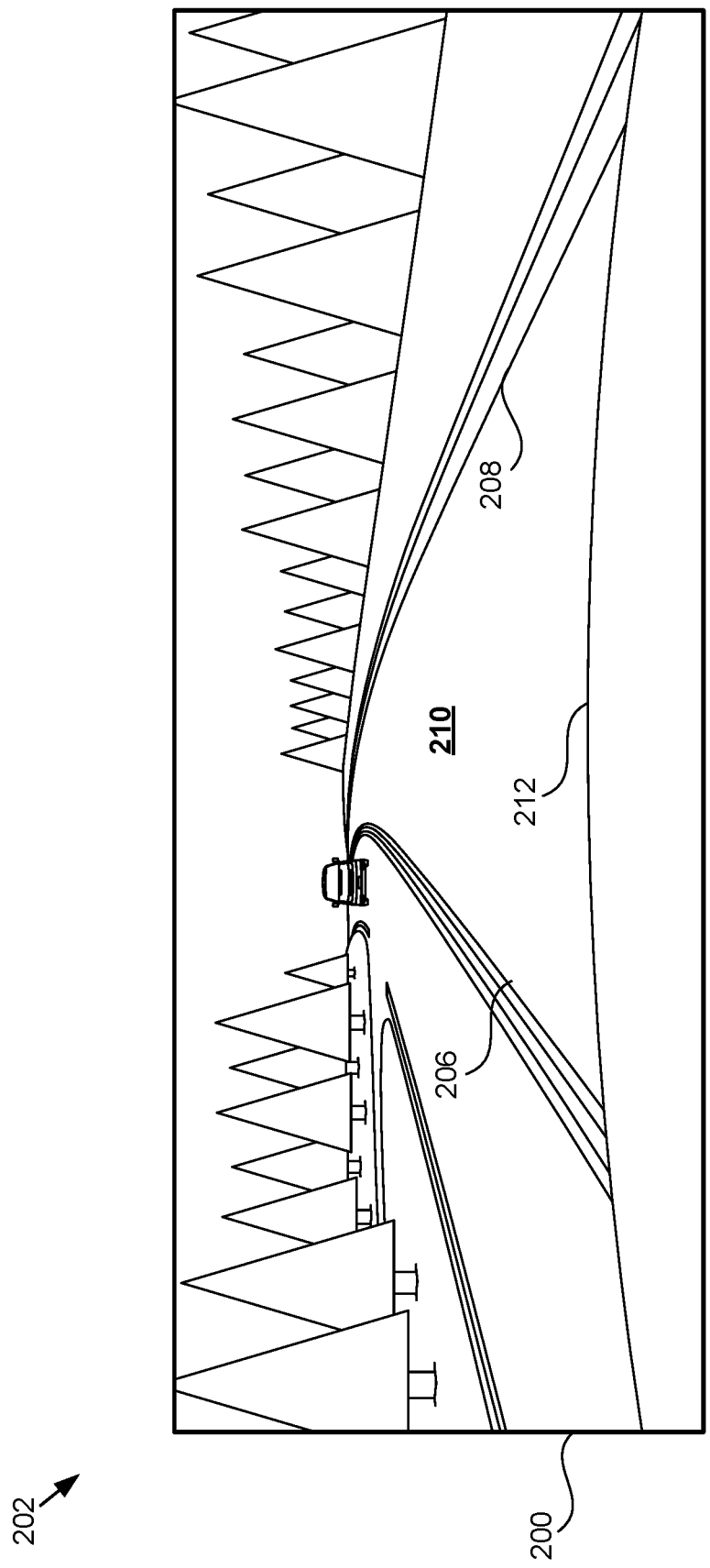
FIG. 2A is an example lane labeling system interface displaying an image, in accordance with some embodiments of the present disclosure.

In at least one embodiment, the image data 104 may be communicated by one or more server(s), via a network, to the user interface 106 on a client device for display. As stated above, an example of the user interface 106 is shown at the first user interface display 202 in FIG. 2A. The first user interface display 202 shows an image 200 represented by the image data 104. In the embodiment in FIG. 2A, the first user interface display 202 shows part 212 (e.g., a hood) of a vehicle, such as a vehicle 700. The part 212 of the vehicle shown in FIG. 2A is due to the placement of a camera, such as a camera 320. In some cases, the camera 320 may not capture the part 212 of the vehicle 700 as shown in FIG. 2A. Beyond, or above, the part 212 of the vehicle 700 in FIG. 2A is a first lane boundary 206 and a second lane boundary 208, which border or bound a lane 210. As the vehicle 700 travels a path down the lane 210, the camera 320, for example, can capture video corresponding to the image data 104 to provide image frames to the first user interface display 202, as shown.

Figure 2B:
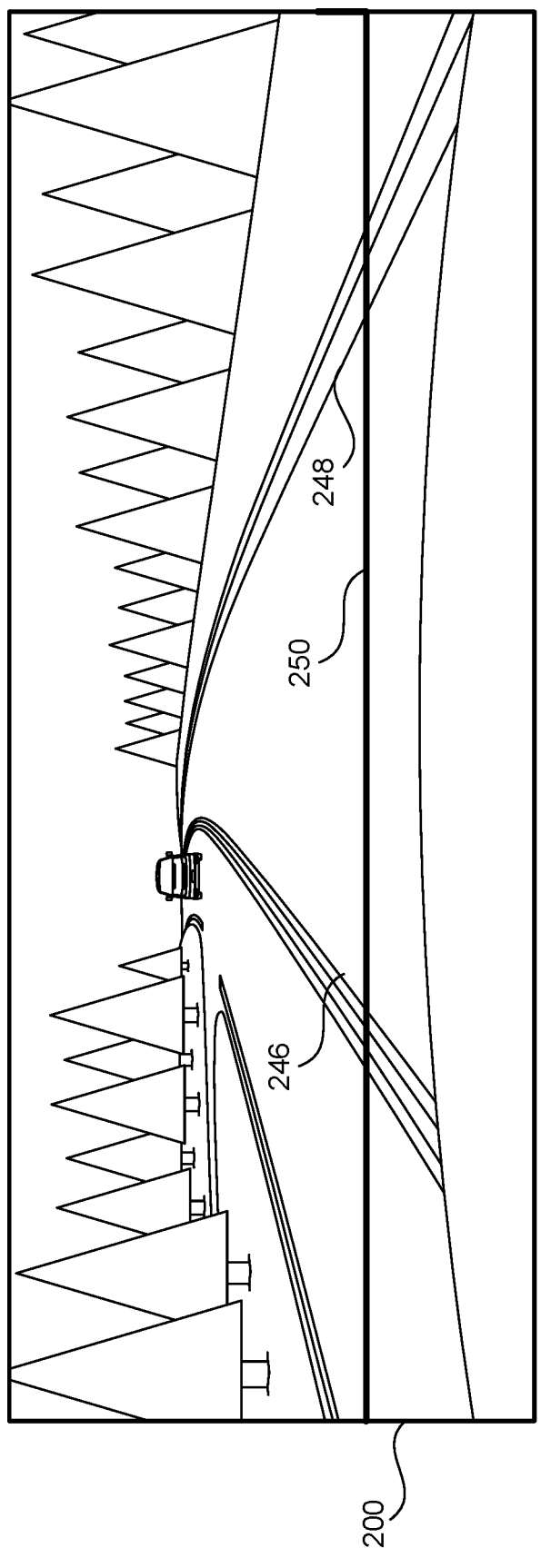
FIG. 2B is an example lane labeling system interface displaying a guiding line with an image, in accordance with some embodiments of the present disclosure.

In FIG. 2B, a second user interface display 242 is illustrated. The second user interface display 242 can show the image or frame 200 from video from the camera 320, as it drives forward. In the second user interface display 242 in FIG. 2B, a guiding line 250 is shown across the display of the image 200. The guiding line 250 can aid a machine or human labeler by restricting the axis used to select one or more points in the image 200 indicating one or more lane boundaries 246, 248 on the second user interface display 242. The input selections that indicate the lane boundaries 246, 248 may be used as or to derive coordinates for the lane boundaries in an image space of the image 200, which may then be projected into machine space using embodiments described herein.

Figure 2C:
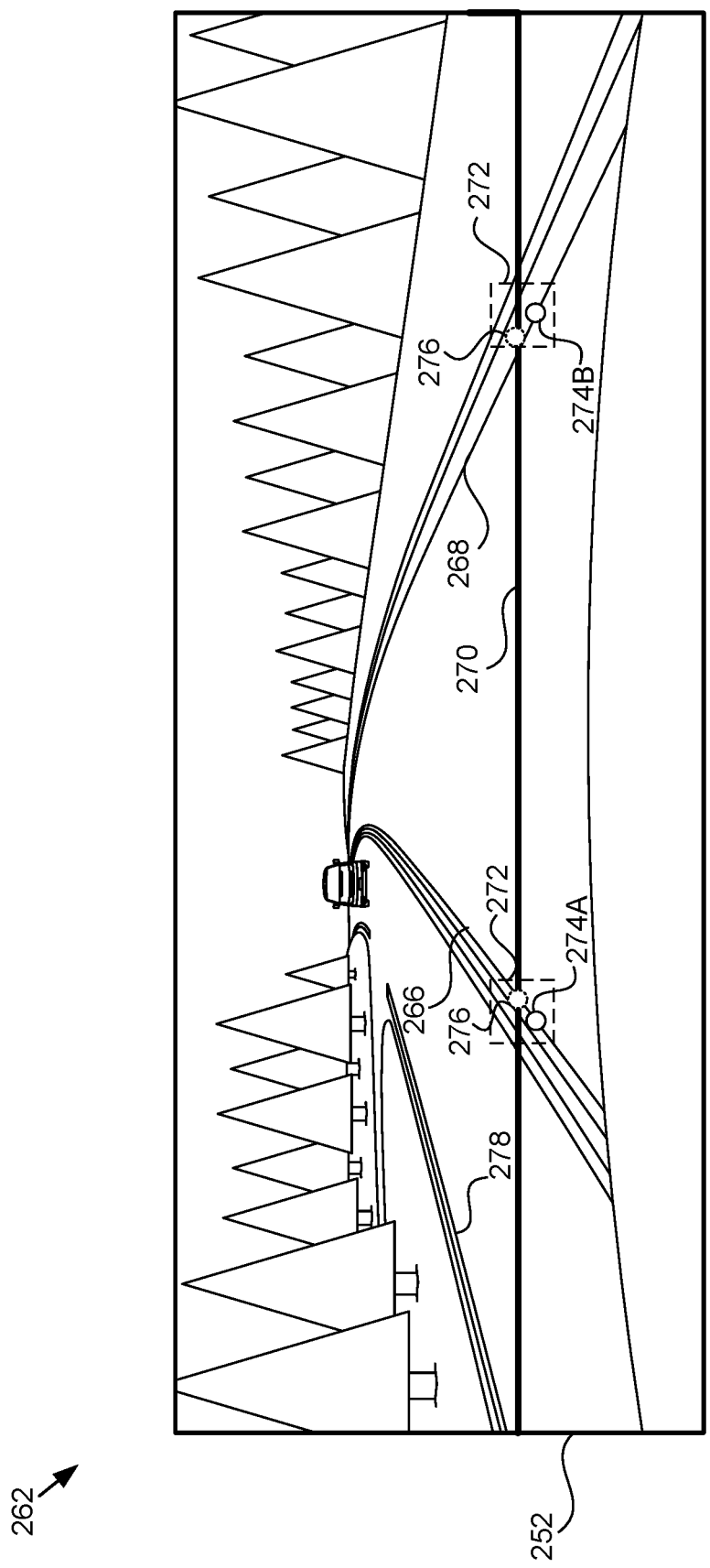
FIG. 2C is an example lane labeling system interface displaying one or more lane boundary points determined based on one or more lane boundary points of a previous frame, in accordance with some embodiments of the present disclosure.
Figure 3:
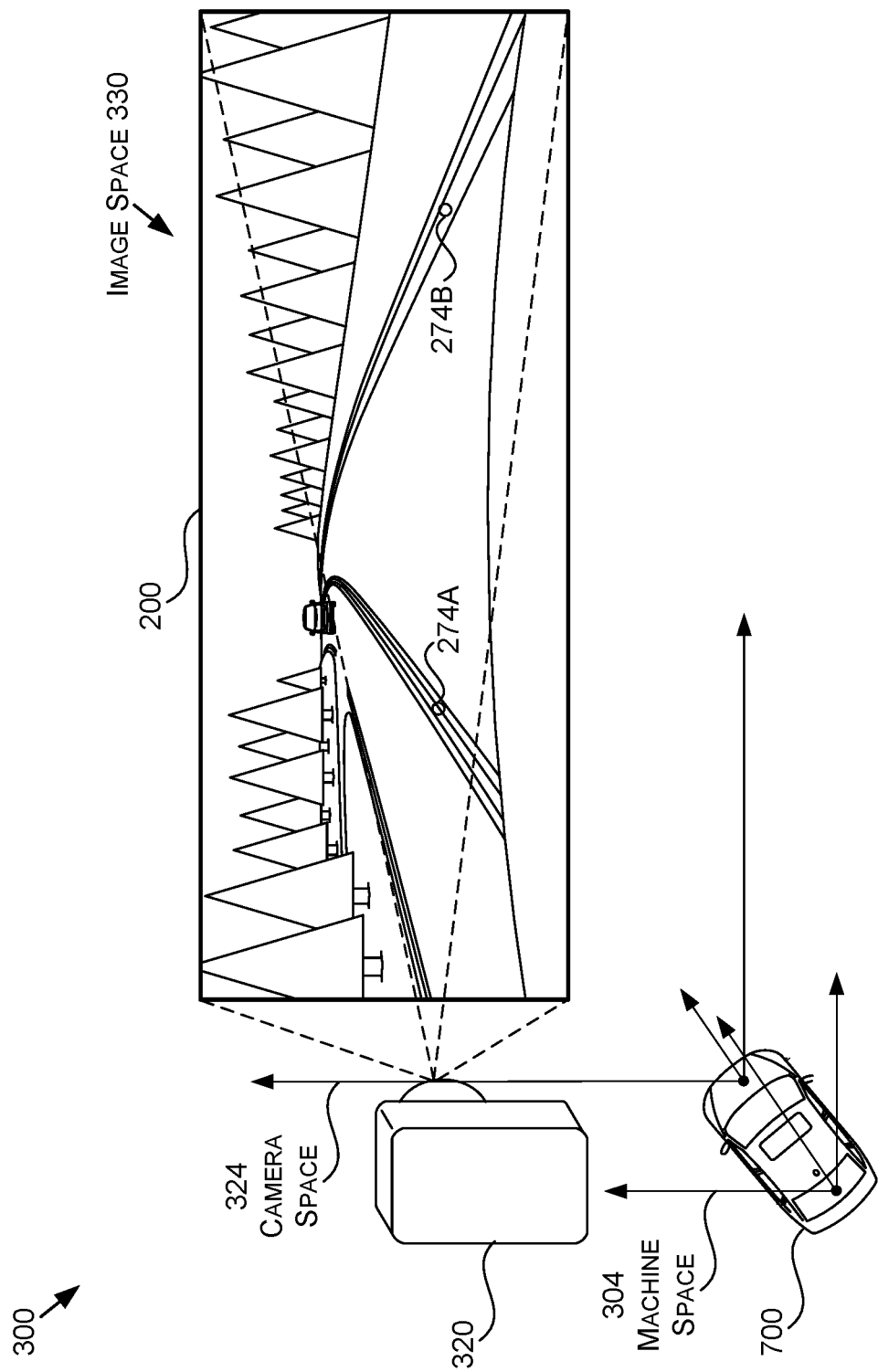
FIG. 3 is a diagram illustrating an example of relationships between coordinate spaces, in accordance with some embodiments of the present disclosure.

FIG. 2C is an example lane labeling system interface displaying one or more lane boundary points determined based on one or more lane boundary points of a previous frame, in accordance with some embodiments of the present disclosure. In FIG. 3C, a third user interface display 262 includes an image 252 depicting a left-lane boundary 266 and a right lane boundary 268, from the perspective of the forward-facing sensor, such as the camera 320 in FIG. 3, affixed to the vehicle 700. The image 252 may comprise an image subsequent to the image 200 (e.g., immediately after or after at least one intermediate frame) in a video represented by the image data 104. A labeler can view the third user interface display 262, which may or may not include a guideline 270. In one or more embodiments, the guideline 270 includes one or more dashes or highlighted areas on a display to guide the user input 102.

Continuing with FIG. 2C, one or more guide regions 272 (e.g., guide boxes) are shown at or near the lane boundary 266 and the right lane boundary 268. A guide region 272 can be used with or without the guideline 270. In embodiments, a guide region 272 indicates an area identified as likely to include a lane boundary, and/or a guide region 272 can indicate an area determined based at least on one or more selections of the lane boundary 266 and/or the right lane boundary 268 made in a prior frame or frames (e.g., in the second user interface display 242 of FIG. 2B). For example, one or more points to be selected as indicating lane boundaries on each video image frame shown on a display, such as the third user interface display 262, are likely to be near the prior points selected as indicating lane boundaries. Therefore, a guide region 272 may be a useful region to search for a lane boundary point for a subsequent label. A prior lane boundary selection 274A or 274B (which may also be referred to herein as "coordinates 274A" and "coordinates 274B") used to determine a suggested lane boundary selection 276 for the image 252 may optionally be displayed on the third user interface display 262, as shown.

In at least one embodiment, the system may determine and/or predict a lane boundary selection for the image 252 (e.g., one or more points in the image 252) using corresponding prior lane boundary selection 274A and/or 274B (e.g., of the image 200 in FIG. 2B) and a guide region 272. For example, the system may search for the new points in guide regions 272. The guide regions 272 may be determined by the system based at least on proximities to the prior lane boundary selections 274A and/or 274B (e.g., a box at least partially around each point) or the system may otherwise extrapolate the prior lane boundary selections 274A or 274B. In at least one embodiment, a guide region 272 may be determined algorithmically, such as based at least on offsetting a prior lane boundary selection 274A and/or 274B. The size of a guide region 272 may be fixed or vary based on various factors, such as prior prediction accuracy of selection suggestions. In at least one embodiment, the system may analyze a portion of the image data 104 representing a guide region 272 to identify and/or predict a suggested lane boundary selection 276. Various approaches are possible for applying the portion of image data to a machine learning model trained to predict a suggested lane boundary selection. In one or more embodiments, the machine learning model may further use a prior lane boundary selection 274A and/or 274B as an input. In one or more embodiments, the system may indicate the prior lane boundary selections 274A, 274B and/or suggested lane boundary selections 276 determined for the current frame, allowing the user to confirm and/or adjust the selections for the current frame.

A labeler may use the suggested lane boundary selection(s) 276 in order to select and/or confirm the same location on the third user interface display 262, and/or as a way to quickly find the location(s) of a lane boundary. For example, a labeler may confirm a suggested lane boundary selection 276 using one or more inputs, such as a single user input (e.g., a mouse click, a keyboard input, etc.), without needing to position a mouse or cursor at a corresponding location in the third user interface display 262. As a further example, the labeler may adjust the suggested lane boundary selection(s) 276 and/or select a different lane boundary selection. In various examples, predicting the suggested lane boundary selection(s) 276 can enable rapid labeling of lane boundaries.

Returning to FIG. 1, FIG. 1 also illustrates the image to machine space projector 108. Information from the user interface 106, such as selected lane boundaries and/or one or more points selected in an image, can be projected from an image space 330 to the machine space 304 by the image to machine space projector 108. For example, FIG. 3 shows the coordinates 274A and 274B in the image space 330 of the image 200, which may be projected to the machine space 304.

As shown in FIG. 3, the machine space 304 can be based on and/or referenced to one or more known points of a vehicle 700. Also as shown in FIG. 3, the camera 320 can comprise one or more sensors used to obtain data, such as the image data 104. The camera 320 can define the camera space 324, which may also be based on and/or referenced to one or more known points of the vehicle 700. As such, the image to machine space projector 108 may transform the coordinates 274A and/or 274B from the image space 330 to the machine space 304 using any suitable image space to camera space projection technique while accounting for the known offsets between the camera 320 and/or the camera space 324 and the machine space 304. For example, as shown, the camera space 324 may be shifted along one or more axes using known offsets to align with the machine space, while accounting for the positioning of the camera 320 in the camera space 324 (which may be centered at the origin of the camera space 324 or positioned elsewhere). In one or more embodiments, the image to machine space projector 108 may use a simplified transform based at least on treating the ground that includes the coordinates 274A and 274B as flat, where the ground may be located at a known position (e.g., height) relative to the camera 320, which may be accounted for in the transform.

Figure 4:
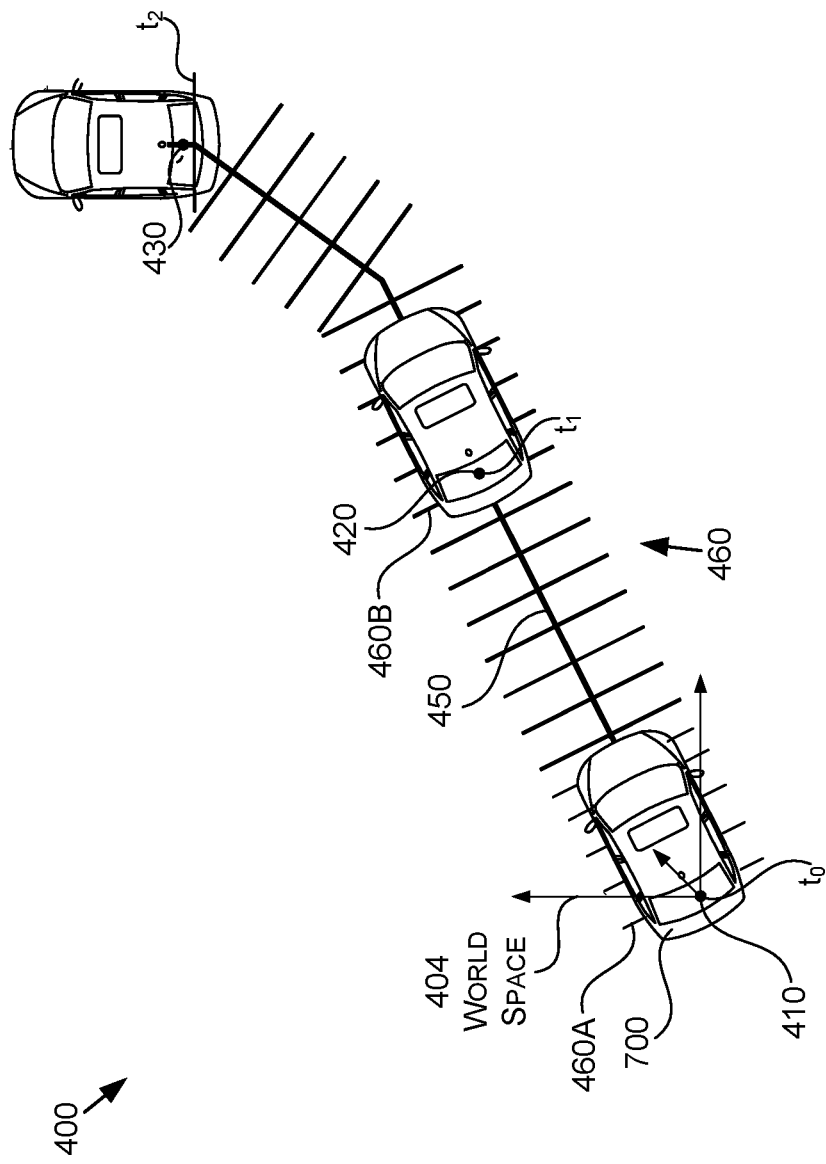
FIG. 4 is a diagram illustrating an example of trajectory information for a trajectory traveled by a vehicle, in accordance with some embodiments of the present disclosure.

The machine to world space correlator 110, as shown in FIG. 1, can correlate, match, and/or align one or more locations in the machine space 304, illustrated in FIG. 3, with one or more locations in the world space 404 of FIG. 4 to convert the coordinates 274A and/or 274B from the machine space 304 to the world space 404. For example, the machine to world space correlator 110 may use one or more known sets of 3D world space coordinates and corresponding orientations associated with the vehicle 700 (corresponding to a pose of the vehicle), such as vehicle trajectory information, over time. The machine to world space correlator 110 may temporally correlate the coordinates 274A and/or 274B in the machine space 304 with a set(s) of known 3D world space coordinates (and/or corresponding measured poses of the vehicle 700), which may correspond to locations of the vehicle 700 along a trajectory 450 in FIG. 4. The machine to world space correlator 110 can correlate sets of coordinates received over time with world space coordinates, for example sets of one or more coordinates received every ten frames of video, using the timestamped image data 104.

In at least one embodiment, one or more of the known sets of 3D world space coordinates corresponding to the trajectory 450 (used to transform sets of machine space coordinates into 3D world space coordinates) and corresponding orientations may be measured (e.g., derived through measurement). For example, while capturing images corresponding to the image data 104 used for labeling, an internal inertial measurement unit (IMU) and/or other measurement devices of the vehicle 700 may be used to determine the known sets of 3D world space coordinates and corresponding orientations using corresponding measurements of the environment. In some implementations, other data besides IMU data may be used to determine the trajectory 450 traveled by the vehicle 700. For example, a global positioning system (GPS) may be used to determine the location and a compass may be used to determine the direction or orientation of the vehicle 700. One or more of the known 3D world space coordinates may be interpolated and/or determined from one or more measured coordinates of the 3D world space coordinates. At least some of the data regarding the trajectory 450, as well as the images, may be timestamped or otherwise include metadata indicating temporal relationships between images and trajectory data (e.g., 3D world space coordinates and orientation). Thus, the machine to world space correlator 110 may temporally correlate the trajectory data with the images (e.g., during or after capture time).

As described above, one or more world space locations or coordinates of the vehicle 700 can be known in world space at one or more time points. For example, FIG. 4 shows that in the world space 404, the vehicle 700 is in a location 410 at time $t_0$. In at least one embodiment, the location 410 of the vehicle 700 at time $t_0$ may include an origin of the world space 404 (e.g., coordinates 0, 0, 0). The vehicle is in a location 420 at $t_1$, and a location 430 at $t_2$. Over time, the vehicle 700 moves through the world space 404, at known locations in the world space 404 that can be recorded and used to transform machine space coordinates or locations into world space coordinates or locations.

In some cases, a trajectory 450 driven by the vehicle 700 is associated with multiple time points 460 along the trajectory 450, of which time points 460A and 460B are individually labelled. Each of the one or more time points 460 can correspond to a time-stamped image frame captured by the camera 320, which can be represented by the image data 104. One or more of such image frames (for example every five or ten frames) can be labeled, an example of which includes the coordinates 274A, 274B. By way of example, the image used to label the coordinates 274A and 274B may correspond to the time point 460B. In at least one embodiment, the machine to world space correlator 110 may correlate the coordinates 274A, 274B and/or image with the location 420 based at least on associating the time $t_1$ with the coordinates 274A, 274B and/or image. For example, the trajectory data recording the trajectory 450 may be temporally aligned to the coordinates 274A, 274B and/or image using the timestamp and/or other time information associated with the coordinates 274A, 274B and/or image. In at least one embodiment, the alignment may include matching a timestamp corresponding to the location 420 with a timestamp corresponding to the image based at least on a temporal proximity between absolute times corresponding to the timestamps. In at least one embodiment, the trajectory data may be captured starting at the same time as the images and/or video corresponding to the time points 460. As such, the timestamps may be the same or similar. In other examples, there may be one or more offsets between the capture times, which may be known and/or determined to match or correlate the absolute times.

The image data 104 for one or more time points 460 is offset from the starting point of the vehicle 310 in world space 404, in embodiments. For example, the vehicle 700 is at a first pose and location at the location 410. This can be used as a starting point or origin for the trajectory 450. At the location 420, the vehicle's location is known to be offset from the origin or starting point at the location 410, along both axes in the world space 404. The offset value(s) are known, in embodiments, for example due to GPS data. At the location 430, the vehicle 310 has turned twice along the trajectory 450. In embodiments, the offset of the location 430 from the origin or starting point at the location 410 is also known. In some cases, GPS or other location or position data of the vehicle 700 along the trajectory 450 is time stamped and associated with the image data 104 at the corresponding times.

Thus, the machine to world space correlator 110 may provide for one or more particular labeled images and/or coordinates, one or more corresponding world space locations (and in some embodiments one or more poses). For example, as indicated above, for the coordinates 274A and/or 274B, the machine to world space correlator 110 may provide the location 420. A machine to world space transformer 112 of FIG. 1 may use the one or more corresponding world space locations and known relative positioning between the coordinate spaces to offset or otherwise define a transform for the set of 3D machine space coordinates to the world space 404. For example, the location 420 may define an origin and/or other location in the machine space 304 for the coordinates 274A and 274B. In at least one embodiment, a known and/or measured pose of the vehicle 700 associated with the location 420 may further define the alignment of the machine space 304 with the world space 404. Thus, based at least on the one or more corresponding world space locations, the machine to world space correlator 110 may compute an offset and/or transform between the machine space 304 and the world space 404, which may be applied to the machine space version of the coordinates 274A and/or 274B to transform them into the world space 404.

As shown in FIG. 1, the machine to world space transformer 112 may provide output to the ground truth generator 114, such as the world space data and/or transform information associated with lane boundaries. Additionally, the ground truth generator 114 may receive the image data 104, in embodiments, as shown in FIG. 1. In some cases, the image data 104 is used by the ground truth generator 114, along with world space transformed version of the coordinates 274A and/or 274B associated with lane boundaries provided using the user input 102, to provide ground truth information. For example, the ground truth generator 114 can determine one or more ground truth lane boundaries for a path taken by a vehicle 700 through an environment. In embodiments, the ground truth generator 114 determines ground world space coordinates any number of images corresponding to the time points 460. Thus, in one or more embodiments, the ground truth generator 114 may use the set(s) of 3D world space coordinates associated with one or more labeled frames, to generate ground truth data. For example, sets of 3D world space coordinates for left and right lane lines from multiple frames may be used to define lane lines for any given frame (e.g., ground truth 3D world space locations of lane lines). In at least one embodiment, the sets of 3D world space coordinates may be used to determine one or more ground truth 3D world space locations for one or more other features in addition to or instead of one or more lanes lines, such as a centerline which may be computed based at least on an average of the world space version of the coordinates 274A and 274B.

In embodiments, the ground truth data and/or trajectories are used by a training engine 116. The training engine 116 may provide training data (e.g., the labeled images and corresponding ground truth 3D world space coordinates) to a machine learning model(s) 118, in embodiments. The training engine 116 may use deep learning, for example, or other algorithms to train the machine learning model(s) 118. For example, and without limitation, the machine learning model (s) 118 may include any type of machine learning model, such as a machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

In some cases, the training engine 116 may use a first portion of data from the training engine 116 for training one or more models, and a second portion of data from the training engine 116 to verify or confirm the training of the models. The one or more models may be implemented for operation of autonomous vehicles, in some cases (e.g., for world perception). In at least one embodiment, the machine learning model(s) 118 are used to predict or infer one or more aspects of a road depicted in an image, such as one or more coordinates of lane boundaries and/or a centerline (e.g., inferred polylines). The vehicle, such as the vehicle 700 or another vehicle, may perform one or more control operations (e.g., steering, accelerating, etc.), such as those described herein, using the coordinates.

Figure 5:
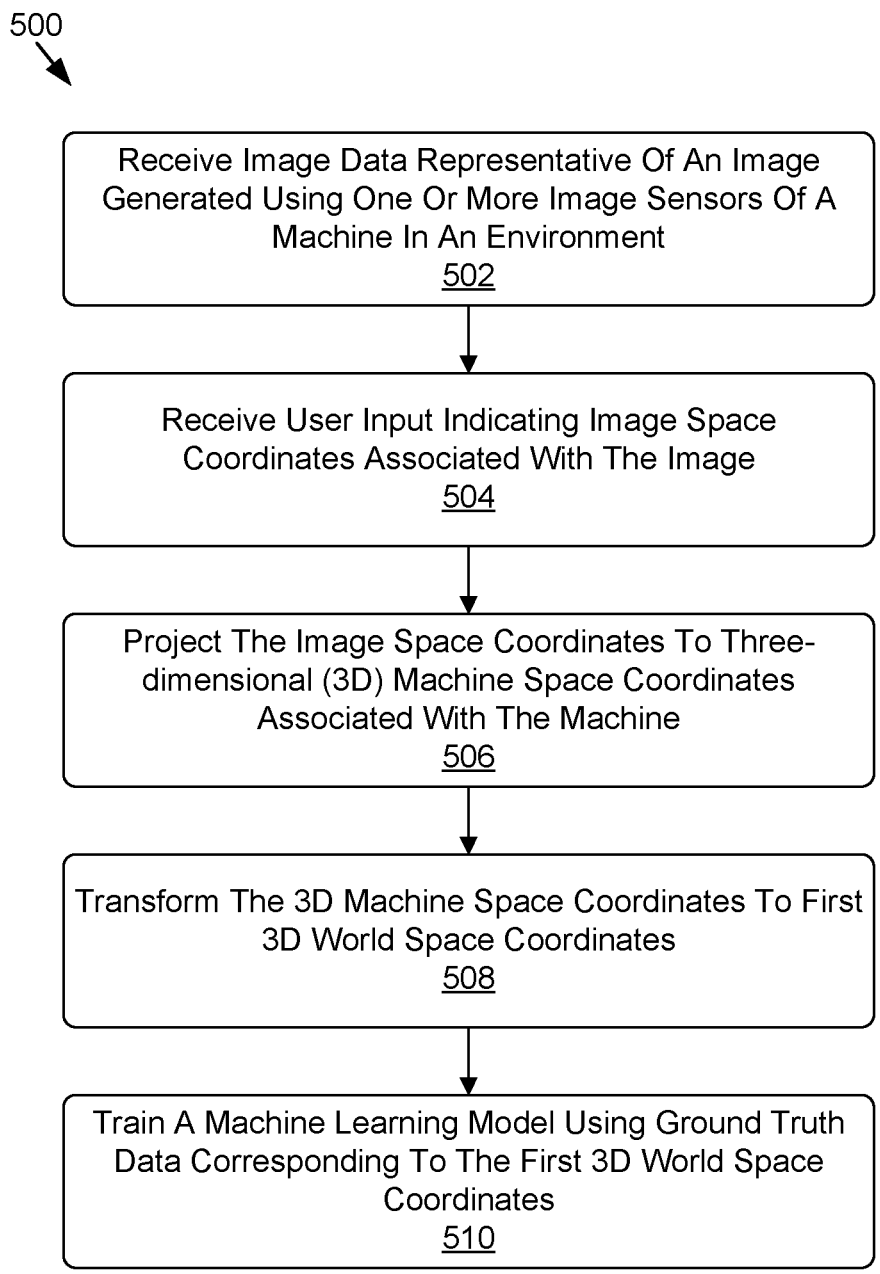
FIG. 5 is a flow diagram showing a method for converting image space coordinates to 3D world space coordinates associated with a machine, in accordance with some embodiments of the present disclosure.

Now referring to FIG. 5, each block of method 500, and other methods described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, methods are described, by way of example, with respect to the system of FIG. 1. However, the methods may additionally or alternatively be executed by any one system, or any combination of systems, including, but not limited to, those described herein.

FIG. 5 is a flow diagram showing the method 500 for converting image space coordinates to 3D world space coordinates associated with a machine, in accordance with some embodiments of the present disclosure. As shown in FIG. 5, at block B502, the method 500 includes receiving image data representative of an image generated using one or more image sensors of a machine in an environment. As one example, a vehicle such as the vehicle 700 may include one or more image sensors, which may be included in the camera 320. The camera 320 is a front-facing camera, in some cases. Other known locations and positions of sensors can be used, such as downward- or rear-facing cameras.

At block B504, the method 500 includes receiving user input indicating image space coordinates associated with the image. In embodiments, the system receives the user input 102 to the user interface 106, for example, from a labeler, to indicate one or more lane boundaries within the image. In some cases, the user input 102 indicates image space coordinates associated with multiple images, such as non-consecutive frames of video, are received at a user interface 106 as video is displayed to the labeler.

At block B506, the method 500 includes projecting coordinates to 3D machine space coordinates associated with machine. For example, the image to machine space projector 108 may project the coordinates to the machine space 304.

At block B508, the method 500 includes transforming the 3D machine space coordinates to first 3D world space coordinates based on a pose of the machine in the environment and second 3D world space coordinates associated with the image and the pose. For example, the machine to world space transformer 112 may transform the 3D machine space coordinates to the first 3D world space coordinates based at least on second 3D world space coordinates corresponding to the location 420 of FIG. 4.

At block B510, the method 500 includes, a machine-learning model being trained using ground truth data corresponding to the first 3D world space coordinates. For example, the first 3D world space coordinates can indicate lane boundaries in the 3D world space. The lane boundaries in the 3D world space can be used to train or verify a machine learning model 118 in inferring a path or trajectory to be taken by an autonomous vehicle.

In some cases, one or more 3D world space coordinates in a first set correspond to a first lane line or boundary, while another set of 3D world space coordinates correspond to a second lane line or boundary. The first set may be associated with the lane boundary points selected by labelers along one side of a lane, such as the left side, while the second set may be associated with the lane boundary points along the other side of the lane, such as the right side. In some cases, a labeler may label points in one or more images, via the user interface 106, to indicate coordinates representing a third lane boundary 278 (as shown in FIG. 2C), for example in an image with two lanes. This could be used to generate ground-truth lane boundaries for two lanes on a road. In some cases, additional lane boundaries can be labeled, up to the amount of additional lanes in an image.

In some cases, the ground truth lane boundaries can be used to calculate a ground truth trajectory for a vehicle, such as an autonomous vehicle. The ground truth trajectory can be determined based at least on calculating a centerline or midpoint in between two lane lines or boundaries. The ground truth trajectory can represent the path in between the lane boundaries, to be followed or traveled by an autonomous vehicle, for example, to train or verify an autonomous vehicle. For example, the ground truth lane boundaries and/or the ground truth trajectory can be generated by the ground truth generator 114 and used by the training engine 116 to train and/or verify the machine learning models 118, as shown in FIG. 1.

The second 3D world space coordinates can be associated with the location of the vehicle 700 or the camera 320, for example based on time-stamped GPS data or other measurement-based information correlated to one or more images of the image data 104. As an example, the second 3D world space coordinates can be ground truth lane boundaries associated with the location of the vehicle 700 at the location 420. The second 3D world space coordinates may relate to one or more time-stamped images recorded or captured at or near the location 420. In embodiments, the second 3D world space coordinates can be generated based on measuring one or more properties of the vehicle 700 in association with generating corresponding portion of the image data 104. In some cases, the measured one or more properties can indicate location, pose, and/or other information about the machine in world space.

Figure 6:
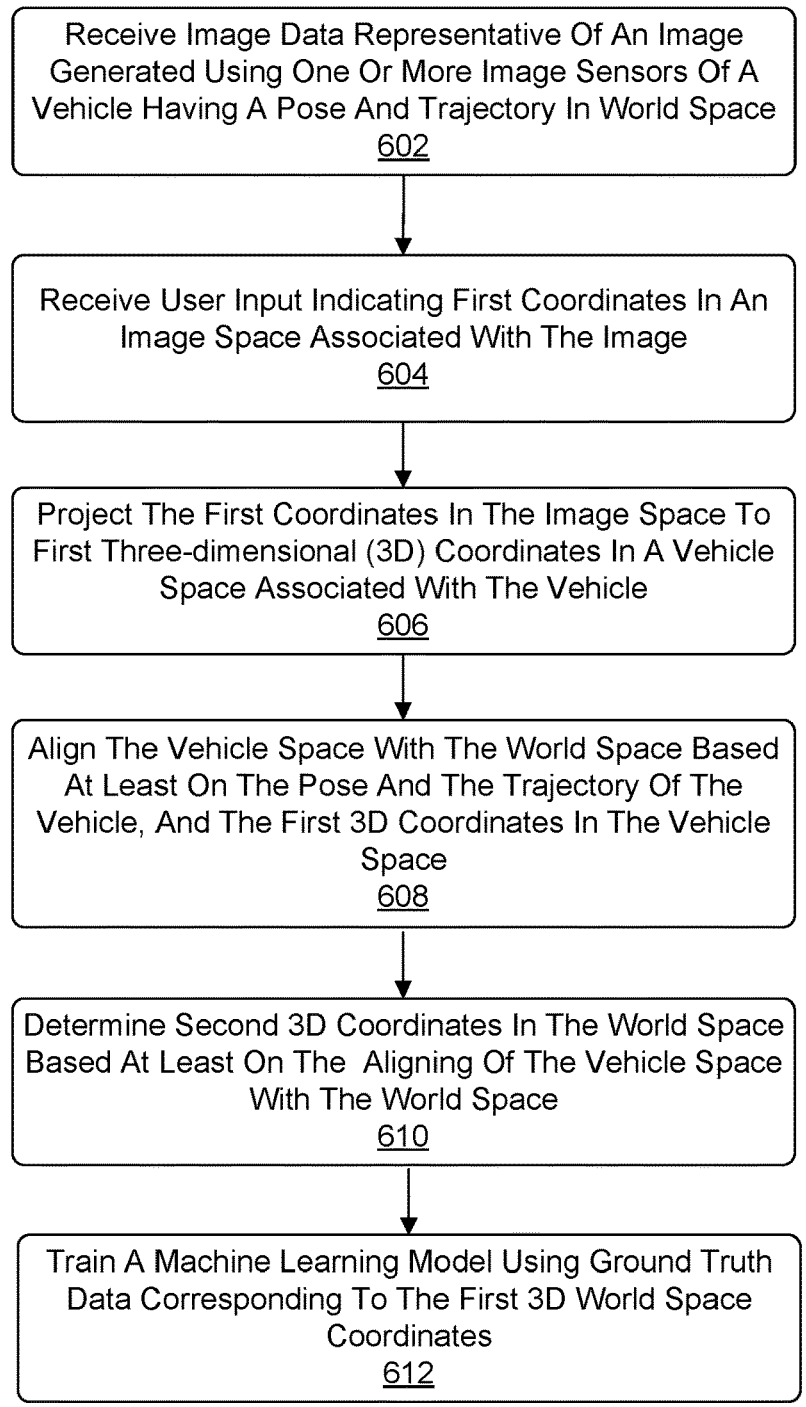
FIG. 6 is a flow diagram showing a method for converting image space coordinates to 3D world space coordinates associated with a machine, in accordance with some embodiments of the present disclosure.

FIG. 6 is a flow diagram showing the method 600 for converting image space coordinates to 3D world space coordinates associated with a vehicle, in accordance with some embodiments of the present disclosure. The method 600, at block B602, includes receiving image data representative of an image generated using one or more image sensors, such as one or more cameras (e.g., the camera 320) of a vehicle having a pose and a trajectory in world space.

At block B604, user input indicating first coordinates in an image space associated with the image is received. For example, the user input 102 can be associated with the image data 104 using the user interface 106.

As shown at block B606, first coordinates in the image space are projected to first 3D coordinates in a vehicle space associated with the vehicle, such as vehicle 700. Continuing with block B608, the vehicle space may be aligned with the world space based at least on the pose of the vehicle, the trajectory of the vehicle, and the first 3D coordinates in the vehicle space. As shown at block B610, second 3D coordinates in the world space are determined based at least on the aligning of the vehicle space with the world space. At block B612, a machine learning model is trained using ground truth data corresponding to the first 3D world space coordinates.

Example Autonomous Vehicle

Figure 7A:
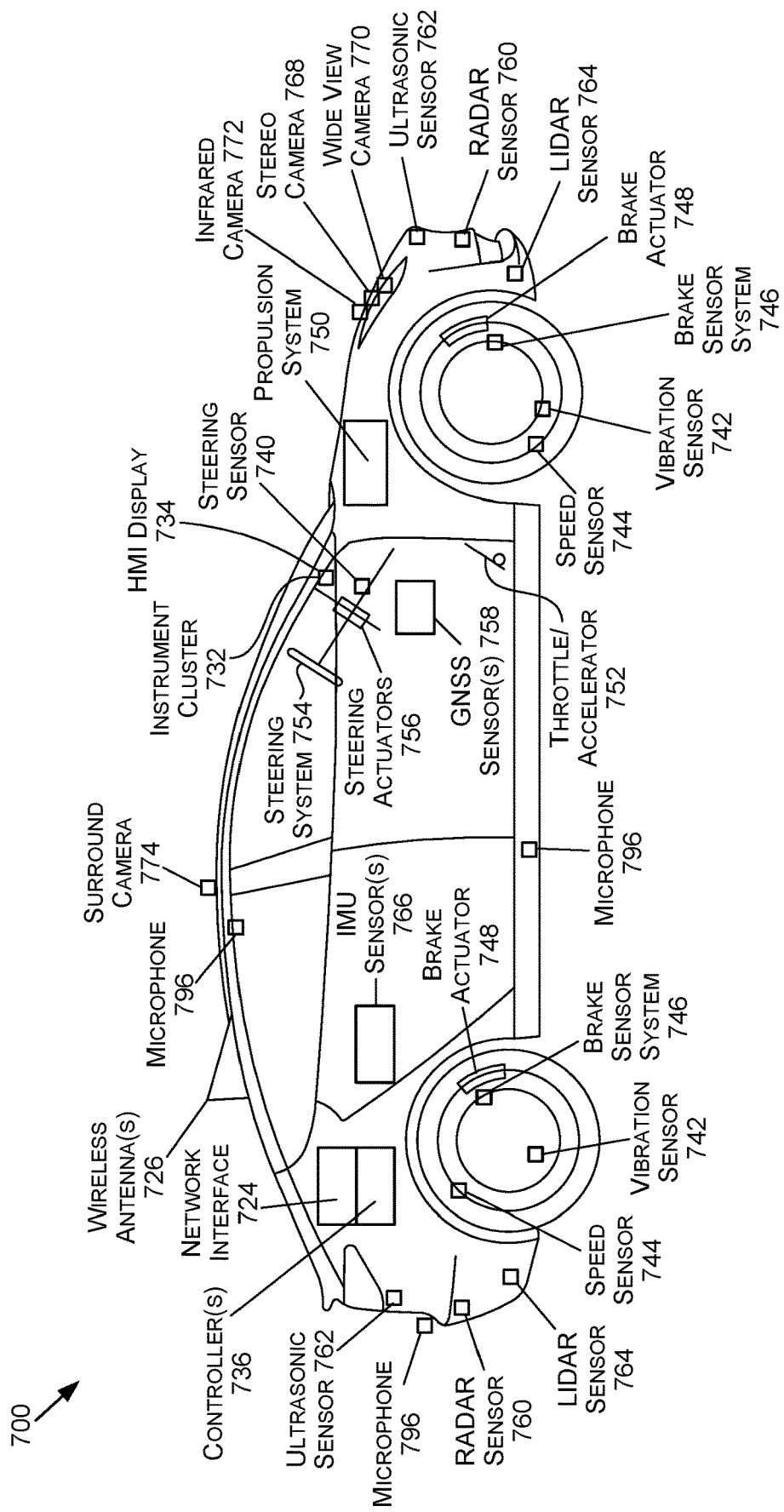
FIG. 7A is an illustration of an example autonomous vehicle, in accordance with some embodiments of the present disclosure.

FIG. 7A is an illustration of an example autonomous vehicle 700, in accordance with some embodiments of the present disclosure. The autonomous vehicle 700 (alternatively referred to herein as the "vehicle 700") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a drone, a vehicle coupled to a trailer, and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 700 may be capable of functionality in accordance with one or more of Level 1-Level 5 of the autonomous driving levels. For example, the vehicle 700 may be capable of driver assistance (Level 1), partial automation (Level 2), conditional automation (Level 3), high automation (Level 4), and/or full automation (Level 5), depending on the embodiment. The term "autonomous," as used herein, may include any and/or all types of autonomy for the vehicle 700 or other machine, such as being fully autonomous, being highly autonomous, being conditionally autonomous, being partially autonomous, providing assistive autonomy, being semi-autonomous, being primarily autonomous, or other designation.

The vehicle 700 may include components such as a chassis, a vehicle body, wheels (e.g., 2, 4, 6, 8, 18, etc.), tires, axles, and other components of a vehicle. The vehicle 700 may include a propulsion system 750, such as an internal combustion engine, hybrid electric power plant, an all-electric engine, and/or another propulsion system type. The propulsion system 750 may be connected to a drive train of the vehicle 700, which may include a transmission, to enable the propulsion of the vehicle 700. The propulsion system 750 may be controlled in response to receiving signals from the throttle/accelerator 752.

A steering system 754, which may include a steering wheel, may be used to steer the vehicle 700 (e.g., along a desired path or route) when the propulsion system 750 is operating (e.g., when the vehicle is in motion). The steering system 754 may receive signals from a steering actuator 756. The steering wheel may be optional for full automation (Level 5) functionality.

The brake sensor system 746 may be used to operate the vehicle brakes in response to receiving signals from the brake actuators 748 and/or brake sensors.

Controller(s) 736, which may include one or more system on chips (SoCs) 704 (FIG. 7C) and/or GPU(s), may provide signals (e.g., representative of commands) to one or more components and/or systems of the vehicle 700. For example, the controller(s) may send signals to operate the vehicle brakes via one or more brake actuators 748, to operate the steering system 754 via one or more steering actuators 756, to operate the propulsion system 750 via one or more throttle/accelerators 752. The controller(s) 736 may include one or more onboard (e.g., integrated) computing devices (e.g., supercomputers) that process sensor signals, and output operation commands (e.g., signals representing commands) to enable autonomous driving and/or to assist a human driver in driving the vehicle 700. The controller(s) 736 may include a first controller 736 for autonomous driving functions, a second controller 736 for functional safety functions, a third controller 736 for artificial intelligence functionality (e.g., computer vision), a fourth controller 736 for infotainment functionality, a fifth controller 736 for redundancy in emergency conditions, and/or other controllers. In some examples, a single controller 736 may handle two or more of the above functionalities, two or more controllers 736 may handle a single functionality, and/or any combination thereof.

The controller(s) 736 may provide the signals for controlling one or more components and/or systems of the vehicle 700 in response to sensor data received from one or more sensors (e.g., sensor inputs). The sensor data may be received from, for example and without limitation, global navigation satellite systems sensor(s) 758 (e.g., Global Positioning System sensor(s)), RADAR sensor(s) 760, ultrasonic sensor(s) 762, LIDAR sensor(s) 764, inertial measurement unit (IMU) sensor(s) 766 (e.g., accelerometer(s), gyroscope(s), magnetic compass(es), magnetometer(s), etc.), microphone(s) 796, stereo camera(s) 768, wide-view camera(s) 770 (e.g., fisheye cameras), infrared camera(s) 772, surround camera(s) 774 (e.g., 360 degree cameras), long-range and/or mid-range camera(s) 798, speed sensor(s) 744 (e.g., for measuring the speed of the vehicle 700), vibration sensor(s) 742, steering sensor(s) 740, brake sensor(s) (e.g., as part of the brake sensor system 746), and/or other sensor types.

One or more of the controller(s) 736 may receive inputs (e.g., represented by input data) from an instrument cluster 732 of the vehicle 700 and provide outputs (e.g., represented by output data, display data, etc.) via a human-machine interface (HMI) display 734, an audible annunciator, a loudspeaker, and/or via other components of the vehicle 700. The outputs may include information such as vehicle velocity, speed, time, map data (e.g., the HD map 722 of FIG. 7C), location data (e.g., the vehicle's 700 location, such as on a map), direction, location of other vehicles (e.g., an occupancy grid), information about objects and status of objects as perceived by the controller(s) 736, etc. For example, the HMI display 734 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 700 further includes a network interface 724 which may use one or more wireless antenna(s) 726 and/or modem(s) to communicate over one or more networks. For example, the network interface 724 may be capable of communication over LTE, WCDMA, UMTS, GSM, CDMA2000, etc. The wireless antenna(s) 726 may also enable communication between objects in the environment (e.g., vehicles, mobile devices, etc.), using local area network(s), such as Bluetooth, Bluetooth LE, Z-Wave, ZigBee, etc., and/or low power wide-area network(s) (LPWANs), such as LoRaWAN, SigFox, etc.

Figure 7B:
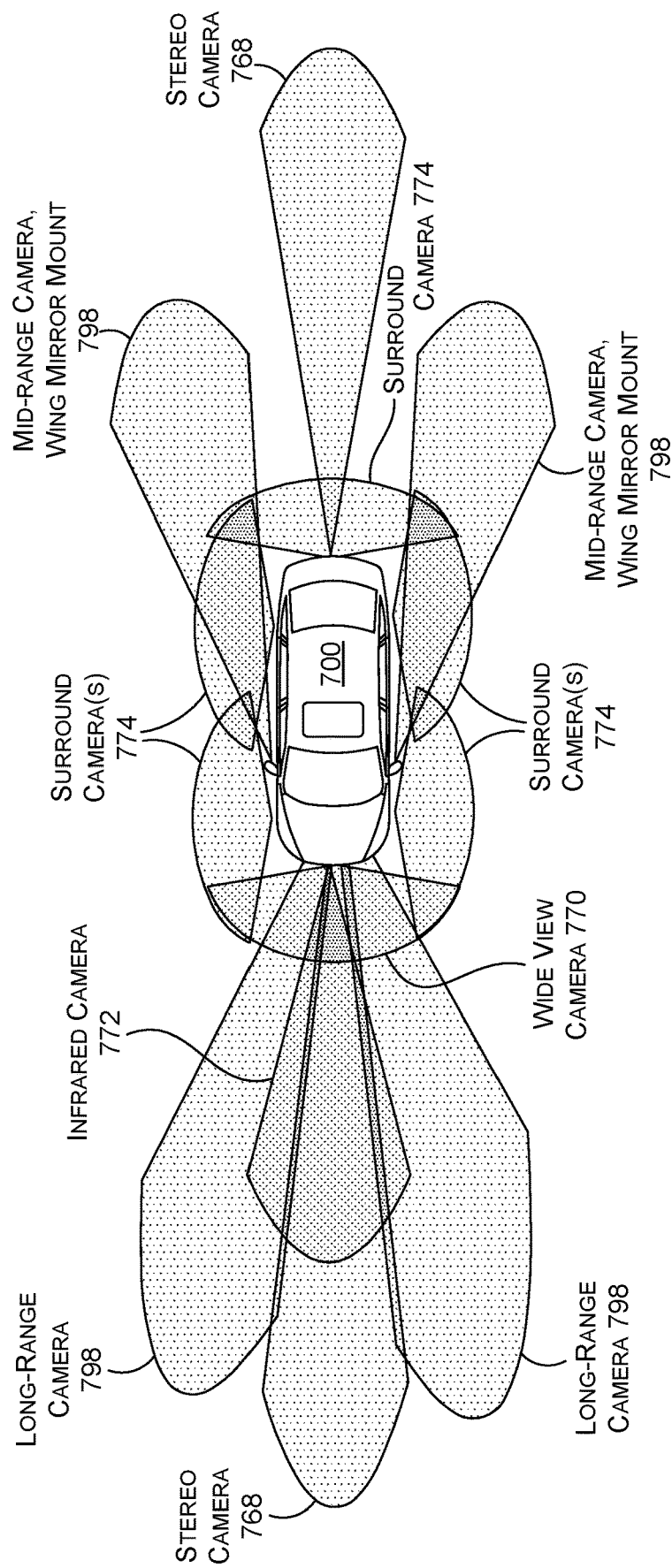
FIG. 7B is an example of camera locations and fields of view for the example autonomous vehicle of FIG. 7A, in accordance with some embodiments of the present disclosure.

FIG. 7B is an example of camera locations and fields of view for the example autonomous vehicle 700 of FIG. 7A, in accordance with some embodiments of the present disclosure. The cameras and respective fields of view are one example embodiment and are not intended to be limiting. For example, additional and/or alternative cameras may be included and/or the cameras may be located at different locations on the vehicle 700.

The camera types for the cameras may include, but are not limited to, digital cameras that may be adapted for use with the components and/or systems of the vehicle 700. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 700 (e.g., front-facing cameras) may be used for surround view, to help identify forward facing paths and obstacles, as well aid in, with the help of one or more controllers 736 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings (LDW), Autonomous Cruise Control (ACC), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 770 that may be used to perceive objects coming into view from the periphery (e.g., pedestrians, crossing traffic or bicycles). Although only one wide-view camera is illustrated in FIG. 7B, there may any number of wide-view cameras 770 on the vehicle 700. In addition, long-range camera(s) 798 (e.g., a long-view stereo camera pair) may be used for depth-based object detection, especially for objects for which a neural network has not yet been trained. The long-range camera(s) 798 may also be used for object detection and classification, as well as basic object tracking.

One or more stereo cameras 768 may also be included in a front-facing configuration. The stereo camera(s) 768 may include an integrated control unit comprising a scalable processing unit, which may provide a programmable logic (FPGA) and a multi-core micro-processor with an integrated CAN or Ethernet interface on a single chip. Such a unit may be used to generate a 3-D map of the vehicle's environment, including a distance estimate for all the points in the image. An alternative stereo camera(s) 768 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 768 may be used in addition to, or alternatively from, those described herein.

Cameras with a field of view that include portions of the environment to the side of the vehicle 700 (e.g., side-view cameras) may be used for surround view, providing information used to create and update the occupancy grid, as well as to generate side impact collision warnings. For example, surround camera(s) 774 (e.g., four surround cameras 774 as illustrated in FIG. 7B) may be positioned to on the vehicle 700. The surround camera(s) 774 may include wide-view camera(s) 770, fisheye camera(s), 360 degree camera(s), and/or the like. Four example, four fisheye cameras may be positioned on the vehicle's front, rear, and sides. In an alternative arrangement, the vehicle may use three surround camera(s) 774 (e.g., left, right, and rear), and may leverage one or more other camera(s) (e.g., a forward-facing camera) as a fourth surround view camera.

Cameras with a field of view that include portions of the environment to the rear of the vehicle 700 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 798, stereo camera(s) 768), infrared camera(s) 772, etc.), as described herein.

Figure 7C:
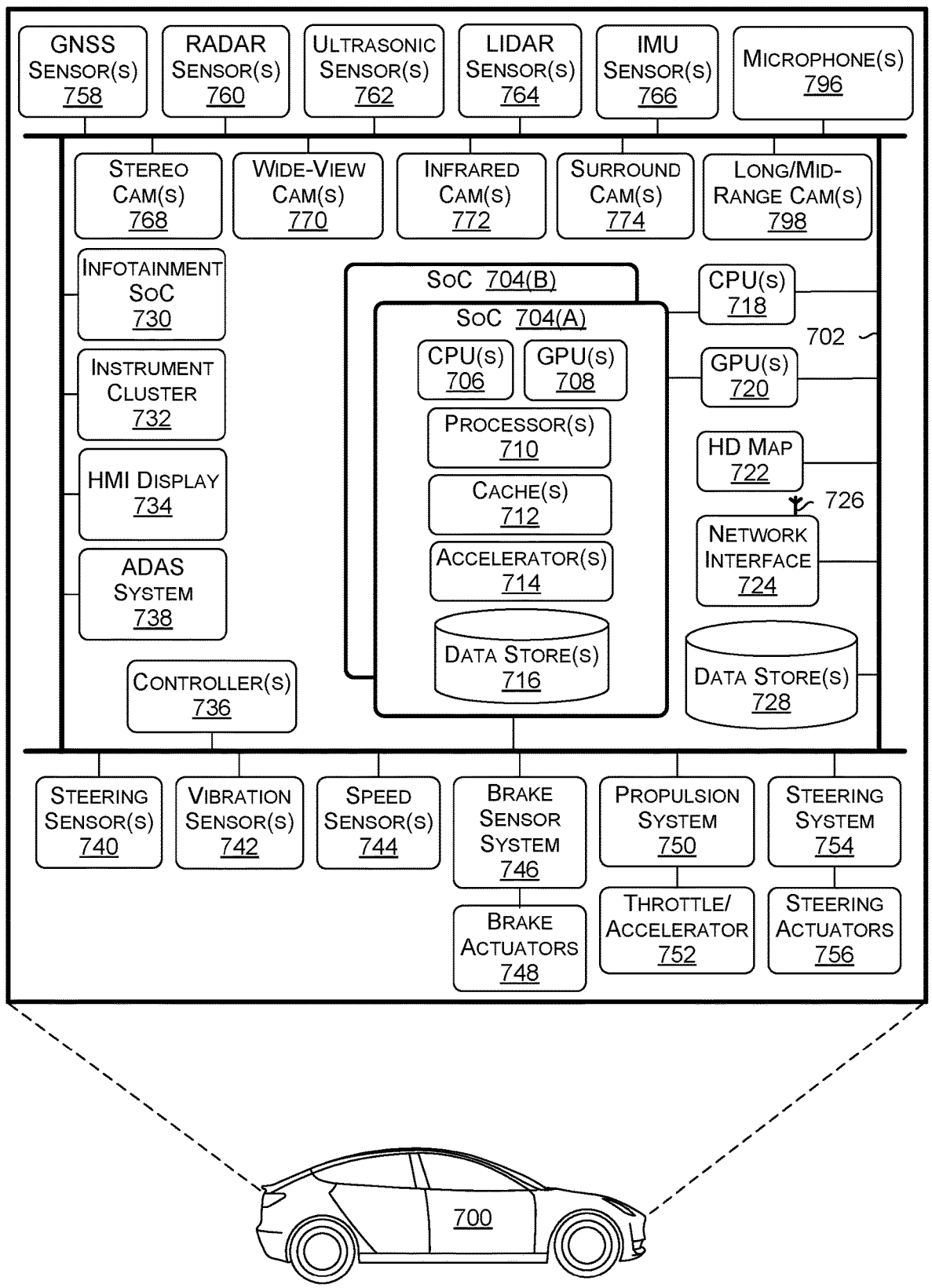
FIG. 7C is a block diagram of an example system architecture for the example autonomous vehicle of FIG. 7A, in accordance with some embodiments of the present disclosure.

FIG. 7C is a block diagram of an example system architecture for the example autonomous vehicle 700 of FIG. 7A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 700 in FIG. 7C are illustrated as being connected via bus 702. The bus 702 may include a Controller Area Network (CAN) data interface (alternatively referred to herein as a "CAN bus"). A CAN may be a network inside the vehicle 700 used to aid in control of various features and functionality of the vehicle 700, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 702 is described herein as being a CAN bus, this is not intended to be limiting. For example, in addition to, or alternatively from, the CAN bus, FlexRay and/or Ethernet may be used. Additionally, although a single line is used to represent the bus 702, this is not intended to be limiting. For example, there may be any number of busses 702, which may include one or more CAN busses, one or more FlexRay busses, one or more Ethernet busses, and/or one or more other types of busses using a different protocol. In some examples, two or more busses 702 may be used to perform different functions, and/or may be used for redundancy. For example, a first bus 702 may be used for collision avoidance functionality and a second bus 702 may be used for actuation control. In any example, each bus 702 may communicate with any of the components of the vehicle 700, and two or more busses 702 may communicate with the same components. In some examples, each SoC 704, each controller 736, and/or each computer within the vehicle may have access to the same input data (e.g., inputs from sensors of the vehicle 700), and may be connected to a common bus, such the CAN bus.

The vehicle 700 may include one or more controller(s) 736, such as those described herein with respect to FIG. 7A. The controller(s) 736 may be used for a variety of functions. The controller(s) 736 may be coupled to any of the various other components and systems of the vehicle 700, and may be used for control of the vehicle 700, artificial intelligence of the vehicle 700, infotainment for the vehicle 700, and/or the like.

The vehicle 700 may include a system(s) on a chip (SoC) 704. The SoC 704 may include CPU(s) 706, GPU(s) 708, processor(s) 710, cache(s) 712, accelerator(s) 714, data store(s) 716, and/or other components and features not illustrated. The SoC(s) 704 may be used to control the vehicle 700 in a variety of platforms and systems. For example, the SoC(s) 704 may be combined in a system (e.g., the system of the vehicle 700) with an HD map 722 which may obtain map refreshes and/or updates via a network interface 724 from one or more servers (e.g., server(s) 778 of FIG. 7D).

The CPU(s) 706 may include a CPU cluster or CPU complex (alternatively referred to herein as a "CCPLEX").

The CPU(s) 706 may include multiple cores and/or L2 caches. For example, in some embodiments, the CPU(s) 706 may include eight cores in a coherent multi-processor configuration. In some embodiments, the CPU(s) 706 may include four dual-core clusters where each cluster has a dedicated L2 cache (e.g., a 2 MB L2 cache). The CPU(s) 706 (e.g., the CCPLEX) may be configured to support simultaneous cluster operation enabling any combination of the clusters of the CPU(s) 706 to be active at any given time.

The CPU(s) 706 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 706 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 708 may include an integrated GPU (alternatively referred to herein as an "iGPU"). The GPU(s) 708 may be programmable and may be efficient for parallel workloads. The GPU(s) 708, in some examples, may use an enhanced tensor instruction set. The GPU(s) 708 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 708 may include at least eight streaming microprocessors. The GPU(s) 708 may use compute application programming interface(s) (API(s)). In addition, the GPU(s) 708 may use one or more parallel computing platforms and/or programming models (e.g., NVIDIA's CUDA).

The GPU(s) 708 may be power-optimized for best performance in automotive and embedded use cases. For example, the GPU(s) 708 may be fabricated on a Fin field-effect transistor (FinFET). However, this is not intended to be limiting and the GPU(s) 708 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 708 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 708 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 708 to access the CPU(s) 706 page tables directly. In such examples, when the GPU(s) 708 memory management unit (MMU) experiences a miss, an address translation request may be transmitted to the CPU(s) 706. In response, the CPU(s) 706 may look in its page tables for the virtual-to-physical mapping for the address and transmits the translation back to the GPU(s) 708. As such, unified memory technology may allow a single unified virtual address space for memory of both the CPU(s) 706 and the GPU(s) 708, thereby simplifying the GPU(s) 708 programming and porting of applications to the GPU(s) 708.

In addition, the GPU(s) 708 may include an access counter that may keep track of the frequency of access of the GPU(s) 708 to memory of other processors. The access counter may help ensure that memory pages are moved to the physical memory of the processor that is accessing the pages most frequently.

The SoC(s) 704 may include any number of cache(s) 712, including those described herein. For example, the cache(s) 712 may include an L3 cache that is available to both the CPU(s) 706 and the GPU(s) 708 (e.g., that is connected both the CPU(s) 706 and the GPU(s) 708). The cache(s) 712 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 704 may include an arithmetic logic unit(s) (ALU(s)) which may be leveraged in performing processing with respect to any of the variety of tasks or operations of the vehicle 700—such as processing DNNs. In addition, the SoC(s) 704 may include a floating point unit(s) (FPU(s))—or other math coprocessor or numeric coprocessor types—for performing mathematical operations within the system. For example, the SoC(s) 704 may include one or more FPUs integrated as execution units within a CPU(s) 706 and/or GPU(s) 708.

The SoC(s) 704 may include one or more accelerators 714 (e.g., hardware accelerators, software accelerators, or a combination thereof). For example, the SoC(s) 704 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 708 and to off-load some of the tasks of the GPU(s) 708 (e.g., to free up more cycles of the GPU(s) 708 for performing other tasks). As an example, the accelerator(s) 714 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 714 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 708, and by using an inference accelerator, for example, a designer may target either the DLA(s) or the GPU(s) 708 for any function. For example, the designer may focus processing of CNNs and floating point operations on the DLA(s) and leave other functions to the GPU(s) 708 and/or other accelerator(s) 714.

The accelerator(s) 714 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 706. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 714 (e.g., the hardware acceleration cluster) may include a computer vision network on-chip and SRAM, for providing a high-bandwidth, low latency SRAM for the accelerator(s) 714. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 704 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 714 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 766 output that correlates with the vehicle 700 orientation, distance, 3D location estimates of the object obtained from the neural network and/or other sensors (e.g., LIDAR sensor(s) 764 or RADAR sensor(s) 760), among others.

The SoC(s) 704 may include data store(s) 716 (e.g., memory). The data store(s) 716 may be on-chip memory of the SoC(s) 704, which may store neural networks to be executed on the GPU and/or the DLA. In some examples, the data store(s) 716 may be large enough in capacity to store multiple instances of neural networks for redundancy and safety. The data store(s) 712 may comprise L2 or L3 cache(s) 712. Reference to the data store(s) 716 may include reference to the memory associated with the PVA, DLA, and/or other accelerator(s) 714, as described herein.

The SoC(s) 704 may include one or more processor(s) 710 (e.g., embedded processors). The processor(s) 710 may include a boot and power management processor that may be a dedicated processor and subsystem to handle boot power and management functions and related security enforcement. The boot and power management processor may be a part of the SoC(s) 704 boot sequence and may provide runtime power management services. The boot power and management processor may provide clock and voltage programming, assistance in system low power state transitions, management of SoC(s) 704 thermals and temperature sensors, and/or management of the SoC(s) 704 power states. Each temperature sensor may be implemented as a ring-oscillator whose output frequency is proportional to temperature, and the SoC(s) 704 may use the ring-oscillators to detect temperatures of the CPU(s) 706, GPU(s) 708, and/or accelerator(s) 714. If temperatures are determined to exceed a threshold, the boot and power management processor may enter a temperature fault routine and put the SoC(s) 704 into a lower power state and/or put the vehicle 700 into a chauffeur to safe stop mode (e.g., bring the vehicle 700 to a safe stop).

The processor(s) 710 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 710 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 710 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 710 may further include a real-time camera engine that may include a dedicated processor subsystem for handling real-time camera management.

The processor(s) 710 may further include a high-dynamic range signal processor that may include an image signal processor that is a hardware engine that is part of the camera processing pipeline.

The processor(s) 710 may include a video image compositor that may be a processing block (e.g., implemented on a microprocessor) that implements video post-processing functions needed by a video playback application to produce the final image for the player window. The video image compositor may perform lens distortion correction on wide-view camera(s) 770, surround camera(s) 774, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 708 is not required to continuously render new surfaces. Even when the GPU(s) 708 is powered on and active doing 3D rendering, the video image compositor may be used to offload the GPU(s) 708 to improve performance and responsiveness.

The SoC(s) 704 may further include a mobile industry processor interface (MIPI) camera serial interface for receiving video and input from cameras, a high-speed interface, and/or a video input block that may be used for camera and related pixel input functions. The SoC(s) 704 may further include an input/output controller(s) that may be controlled by software and may be used for receiving I/O signals that are uncommitted to a specific role.

The SoC(s) 704 may further include a broad range of peripheral interfaces to enable communication with peripherals, audio codecs, power management, and/or other devices. The SoC(s) 704 may be used to process data from cameras (e.g., connected over Gigabit Multimedia Serial Link and Ethernet), sensors (e.g., LIDAR sensor(s) 764, RADAR sensor(s) 760, etc. that may be connected over Ethernet), data from bus 702 (e.g., speed of vehicle 700, steering wheel position, etc.), data from GNSS sensor(s) 758 (e.g., connected over Ethernet or CAN bus). The SoC(s) 704 may further include dedicated high-performance mass storage controllers that may include their own DMA engines, and that may be used to free the CPU(s) 706 from routine data management tasks.

The SoC(s) 704 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 704 may be faster, more reliable, and even more energy-efficient and space-efficient than conventional systems. For example, the accelerator(s) 714, when combined with the CPU(s) 706, the GPU(s) 708, and the data store(s) 716, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 720) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 708.

In some examples, a CNN for facial recognition and vehicle owner identification may use data from camera sensors to identify the presence of an authorized driver and/or owner of the vehicle 700. The always on sensor processing engine may be used to unlock the vehicle when the owner approaches the driver door and turn on the lights, and, in security mode, to disable the vehicle when the owner leaves the vehicle. In this way, the SoC(s) 704 provide for security against theft and/or carjacking.

In another example, a CNN for emergency vehicle detection and identification may use data from microphones 796 to detect and identify emergency vehicle sirens. In contrast to conventional systems, that use general classifiers to detect sirens and manually extract features, the SoC(s) 704 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 758. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 762, until the emergency vehicle(s) passes.

The vehicle may include a CPU(s) 718 (e.g., discrete CPU(s), or dCPU(s)), that may be coupled to the SoC(s) 704 via a high-speed interconnect (e.g., PCIe). The CPU(s) 718 may include an X86 processor, for example. The CPU(s) 718 may be used to perform any of a variety of functions, including arbitrating potentially inconsistent results between ADAS sensors and the SoC(s) 704, and/or monitoring the status and health of the controller(s) 736 and/or infotainment SoC 730, for example.

The vehicle 700 may include a GPU(s) 720 (e.g., discrete GPU(s), or dGPU(s)), that may be coupled to the SoC(s) 704 via a high-speed interconnect (e.g., NVIDIA's NVLINK). The GPU(s) 720 may provide additional artificial intelligence functionality, such as by executing redundant and/or different neural networks, and may be used to train and/or update neural networks based on input (e.g., sensor data) from sensors of the vehicle 700.

The vehicle 700 may further include the network interface 724 which may include one or more wireless antennas 726 (e.g., one or more wireless antennas for different communication protocols, such as a cellular antenna, a Bluetooth antenna, etc.). The network interface 724 may be used to enable wireless connectivity over the Internet with the cloud (e.g., with the server(s) 778 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 700 information about vehicles in proximity to the vehicle 700 (e.g., vehicles in front of, on the side of, and/or behind the vehicle 700). This functionality may be part of a cooperative adaptive cruise control functionality of the vehicle 700.

The network interface 724 may include a SoC that provides modulation and demodulation functionality and enables the controller(s) 736 to communicate over wireless networks. The network interface 724 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 700 may further include data store(s) 728 which may include off-chip (e.g., off the SoC(s) 704) storage. The data store(s) 728 may include one or more storage elements including RAM, SRAM, DRAM, VRAM, Flash, hard disks, and/or other components and/or devices that may store at least one bit of data.

The vehicle 700 may further include GNSS sensor(s) 758. The GNSS sensor(s) 758 (e.g., GPS, assisted GPS sensors, differential GPS (DGPS) sensors, etc.), to assist in mapping, perception, occupancy grid generation, and/or path planning functions. Any number of GNSS sensor(s) 758 may be used, including, for example and without limitation, a GPS using a USB connector with an Ethernet to Serial (RS-232) bridge.

The vehicle 700 may further include RADAR sensor(s) 760. The RADAR sensor(s) 760 may be used by the vehicle 700 for long-range vehicle detection, even in darkness and/or severe weather conditions. RADAR functional safety levels may be ASIL B. The RADAR sensor(s) 760 may use the CAN and/or the bus 702 (e.g., to transmit data generated by the RADAR sensor(s) 760) for control and to access object tracking data, with access to Ethernet to access raw data in some examples. A wide variety of RADAR sensor types may be used. For example, and without limitation, the RADAR sensor(s) 760 may be suitable for front, rear, and side RADAR use. In some example, Pulse Doppler RADAR sensor(s) are used.

The RADAR sensor(s) 760 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 760 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 700 surroundings at higher speeds with minimal interference from traffic in adjacent lanes. The other two antennae may expand the field of view, making it possible to quickly detect vehicles entering or leaving the vehicle's 700 lane.

Mid-range RADAR systems may include, as an example, a range of up to 760 m (front) or 80 m (rear), and a field of view of up to 42 degrees (front) or 750 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 700 may further include ultrasonic sensor(s) 762. The ultrasonic sensor(s) 762, which may be positioned at the front, back, and/or the sides of the vehicle 700, may be used for park assist and/or to create and update an occupancy grid. A wide variety of ultrasonic sensor(s) 762 may be used, and different ultrasonic sensor(s) 762 may be used for different ranges of detection (e.g., 2.5 m, 4 m). The ultrasonic sensor(s) 762 may operate at functional safety levels of ASIL B.

The vehicle 700 may include LIDAR sensor(s) 764. The LIDAR sensor(s) 764 may be used for object and pedestrian detection, emergency braking, collision avoidance, and/or other functions. The LIDAR sensor(s) 764 may be functional safety level ASIL B. In some examples, the vehicle 700 may include multiple LIDAR sensors 764 (e.g., two, four, six, etc.) that may use Ethernet (e.g., to provide data to a Gigabit Ethernet switch).

In some examples, the LIDAR sensor(s) 764 may be capable of providing a list of objects and their distances for a 360-degree field of view. Commercially available LIDAR sensor(s) 764 may have an advertised range of approximately 700 m, with an accuracy of 2 cm-3 cm, and with support for a 700 Mbps Ethernet connection, for example. In some examples, one or more non-protruding LIDAR sensors 764 may be used. In such examples, the LIDAR sensor(s) 764 may be implemented as a small device that may be embedded into the front, rear, sides, and/or corners of the vehicle 700. The LIDAR sensor(s) 764, in such examples, may provide up to a 120-degree horizontal and 35-degree vertical field-of-view, with a 200 m range even for low-reflectivity objects. Front-mounted LIDAR sensor(s) 764 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 700. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 764 may be less susceptible to motion blur, vibration, and/or shock.

The vehicle may further include IMU sensor(s) 766. The IMU sensor(s) 766 may be located at a center of the rear axle of the vehicle 700, in some examples. The IMU sensor(s) 766 may include, for example and without limitation, an accelerometer(s), a magnetometer(s), a gyroscope(s), a magnetic compass(es), and/or other sensor types. In some examples, such as in six-axis applications, the IMU sensor(s) 766 may include accelerometers and gyroscopes, while in nine-axis applications, the IMU sensor(s) 766 may include accelerometers, gyroscopes, and magnetometers.

In some embodiments, the IMU sensor(s) 766 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 766 may enable the vehicle 700 to estimate heading without requiring input from a magnetic sensor by directly observing and correlating the changes in velocity from GPS to the IMU sensor(s) 766. In some examples, the IMU sensor(s) 766 and the GNSS sensor(s) 758 may be combined in a single integrated unit.

The vehicle may include microphone(s) 796 placed in and/or around the vehicle 700. The microphone(s) 796 may be used for emergency vehicle detection and identification, among other things.

The vehicle may further include any number of camera types, including stereo camera(s) 768, wide-view camera(s) 770, infrared camera(s) 772, surround camera(s) 774, long-range and/or mid-range camera(s) 798, and/or other camera types. The cameras may be used to capture image data around an entire periphery of the vehicle 700. The types of cameras used depends on the embodiments and requirements for the vehicle 700, and any combination of camera types may be used to provide the necessary coverage around the vehicle 700. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 7A and FIG. 7B.

The vehicle 700 may further include vibration sensor(s) 742. The vibration sensor(s) 742 may measure vibrations of components of the vehicle, such as the axle(s). For example, changes in vibrations may indicate a change in road surfaces. In another example, when two or more vibration sensors 742 are used, the differences between the vibrations may be used to determine friction or slippage of the road surface (e.g., when the difference in vibration is between a power-driven axle and a freely rotating axle).

The vehicle 700 may include an ADAS system 738. The ADAS system 738 may include a SoC, in some examples. The ADAS system 738 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 760, LIDAR sensor(s) 764, and/or a camera(s). The ACC systems may include longitudinal ACC and/or lateral ACC. Longitudinal ACC monitors and controls the distance to the vehicle immediately ahead of the vehicle 700 and automatically adjust the vehicle speed to maintain a safe distance from vehicles ahead. Lateral ACC performs distance keeping, and advises the vehicle 700 to change lanes when necessary. Lateral ACC is related to other ADAS applications such as LCA and CWS.

CACC uses information from other vehicles that may be received via the network interface 724 and/or the wireless antenna(s) 726 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 700), while the I2V communication concept provides information about traffic further ahead. CACC systems may include either or both I2V and V2V information sources. Given the information of the vehicles ahead of the vehicle 700, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 760, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 760, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 700 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 700 if the vehicle 700 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 760, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 700 is backing up. Some RCTW systems include AEB to ensure that the vehicle brakes are applied to avoid a crash. RCTW systems may use one or more rear-facing RADAR sensor(s) 760, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 700, the vehicle 700 itself must, in the case of conflicting results, decide whether to heed the result from a primary computer or a secondary computer (e.g., a first controller 736 or a second controller 736). For example, in some embodiments, the ADAS system 738 may be a backup and/or secondary computer for providing perception information to a backup computer rationality module. The backup computer rationality monitor may run a redundant diverse software on hardware components to detect faults in perception and dynamic driving tasks. Outputs from the ADAS system 738 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 704.

In other examples, ADAS system 738 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 738 may be fed into the primary computer's perception block and/or the primary computer's dynamic driving task block. For example, if the ADAS system 738 indicates a forward crash warning due to an object immediately ahead, the perception block may use this information when identifying objects. In other examples, the secondary computer may have its own neural network which is trained and thus reduces the risk of false positives, as described herein.

The vehicle 700 may further include the infotainment SoC 730 (e.g., an in-vehicle infotainment system (IVI)). Although illustrated and described as a SoC, the infotainment system may not be a SoC, and may include two or more discrete components. The infotainment SoC 730 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 700. For example, the infotainment SoC 730 may radios, disk players, navigation systems, video players, USB and Bluetooth connectivity, carputers, in-car entertainment, Wi-Fi, steering wheel audio controls, hands free voice control, a heads-up display (HUD), an HMI display 734, a telematics device, a control panel (e.g., for controlling and/or interacting with various components, features, and/or systems), and/or other components. The infotainment SoC 730 may further be used to provide information (e.g., visual and/or audible) to a user(s) of the vehicle, such as information from the ADAS system 738, autonomous driving information such as planned vehicle maneuvers, trajectories, surrounding environment information (e.g., intersection information, vehicle information, road information, etc.), and/or other information.

The infotainment SoC 730 may include GPU functionality. The infotainment SoC 730 may communicate over the bus 702 (e.g., CAN bus, Ethernet, etc.) with other devices, systems, and/or components of the vehicle 700. In some examples, the infotainment SoC 730 may be coupled to a supervisory MCU such that the GPU of the infotainment system may perform some self-driving functions in the event that the primary controller(s) 736 (e.g., the primary and/or backup computers of the vehicle 700) fail. In such an example, the infotainment SoC 730 may put the vehicle 700 into a chauffeur to safe stop mode, as described herein.

The vehicle 700 may further include an instrument cluster 732 (e.g., a digital dash, an electronic instrument cluster, a digital instrument panel, etc.). The instrument cluster 732 may include a controller and/or supercomputer (e.g., a discrete controller or supercomputer). The instrument cluster 732 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 730 and the instrument cluster 732. In other words, the instrument cluster 732 may be included as part of the infotainment SoC 730, or vice versa.

Figure 7D:
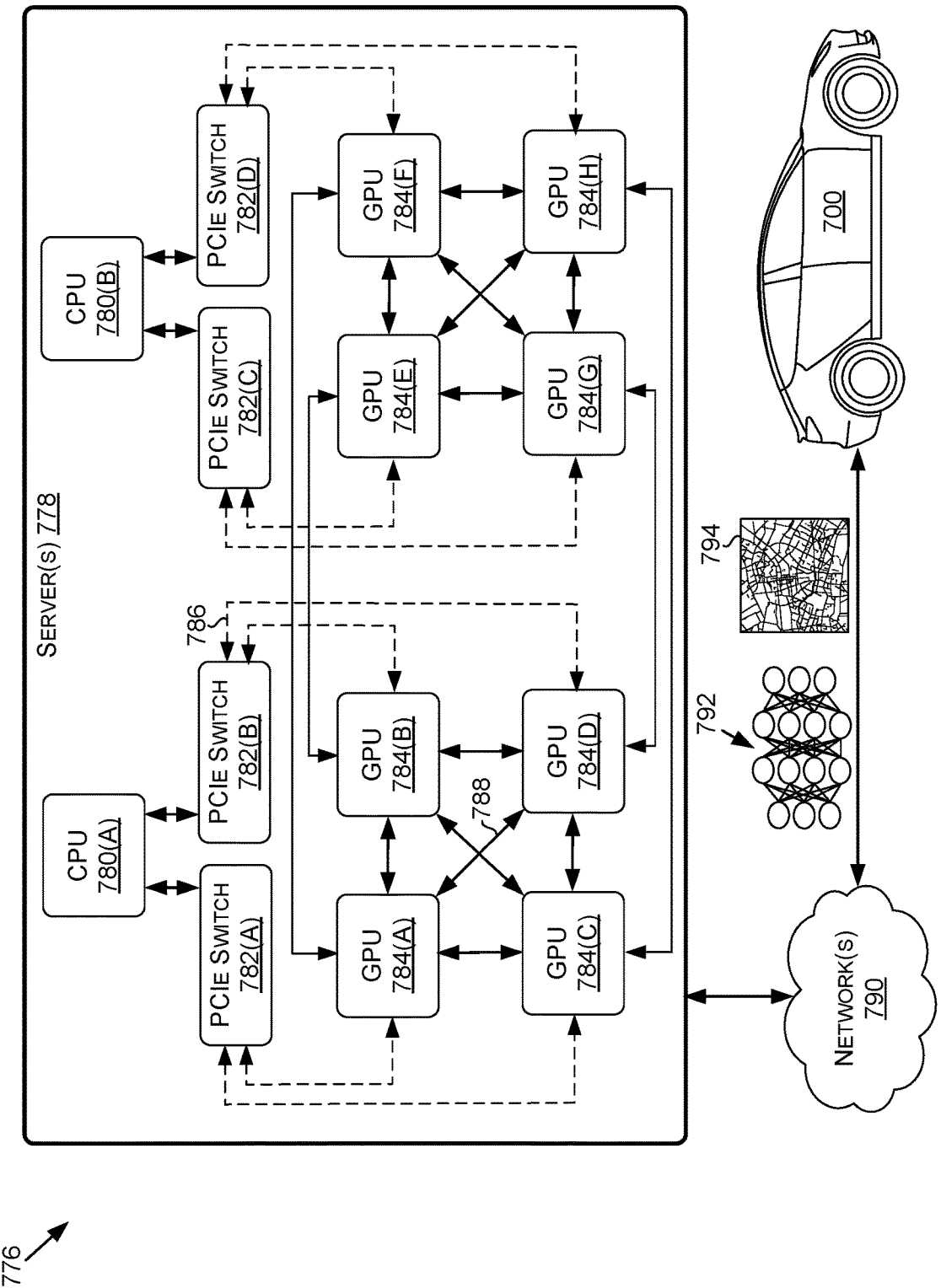
FIG. 7D is a system diagram for communication between cloud-based server(s) and the example autonomous vehicle of FIG. 7A, in accordance with some embodiments of the present disclosure.

FIG. 7D is a system diagram for communication between cloud-based server(s) and the example autonomous vehicle 700 of FIG. 7A, in accordance with some embodiments of the present disclosure. The system 776 may include server(s) 778, network(s) 790, and vehicles, including the vehicle 700. The server(s) 778 may include a plurality of GPUs 784(A)-784(H) (collectively referred to herein as GPUs 784), PCIe switches 782(A)-782(H) (collectively referred to herein as PCIe switches 782), and/or CPUs 780(A)-780(B) (collectively referred to herein as CPUs 780). The GPUs 784, the CPUs 780, and the PCIe switches may be interconnected with high-speed interconnects such as, for example and without limitation, NVLink interfaces 788 developed by NVIDIA and/or PCIe connections 786. In some examples, the GPUs 784 are connected via NVLink and/or NVSwitch SoC and the GPUs 784 and the PCIe switches 782 are connected via PCIe interconnects. Although eight GPUs 784, two CPUs 780, and two PCIe switches are illustrated, this is not intended to be limiting. Depending on the embodiment, each of the server(s) 778 may include any number of GPUs 784, CPUs 780, and/or PCIe switches. For example, the server(s) 778 may each include eight, sixteen, thirty-two, and/or more GPUs 784.

The server(s) 778 may receive, over the network(s) 790 and from the vehicles, image data representative of images showing unexpected or changed road conditions, such as recently commenced road-work. The server(s) 778 may transmit, over the network(s) 790 and to the vehicles, neural networks 792, updated neural networks 792, and/or map information 794, including information regarding traffic and road conditions. The updates to the map information 794 may include updates for the HD map 722, such as information regarding construction sites, potholes, detours, flooding, and/or other obstructions. In some examples, the neural networks 792, the updated neural networks 792, and/or the map information 794 may have resulted from new training and/or experiences represented in data received from any number of vehicles in the environment, and/or based on training performed at a datacenter (e.g., using the server(s) 778 and/or other servers).

The server(s) 778 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 790, and/or the machine learning models may be used by the server(s) 778 to remotely monitor the vehicles.

In some examples, the server(s) 778 may receive data from the vehicles and apply the data to up-to-date real-time neural networks for real-time intelligent inferencing. The server(s) 778 may include deep-learning supercomputers and/or dedicated AI computers powered by GPU(s) 784, such as a DGX and DGX Station machines developed by NVIDIA. However, in some examples, the server(s) 778 may include deep learning infrastructure that use only CPU-powered datacenters.

The deep-learning infrastructure of the server(s) 778 may be capable of fast, real-time inferencing, and may use that capability to evaluate and verify the health of the processors, software, and/or associated hardware in the vehicle 700. For example, the deep-learning infrastructure may receive periodic updates from the vehicle 700, such as a sequence of images and/or objects that the vehicle 700 has located in that sequence of images (e.g., via computer vision and/or other machine learning object classification techniques). The deep-learning infrastructure may run its own neural network to identify the objects and compare them with the objects identified by the vehicle 700 and, if the results do not match and the infrastructure concludes that the AI in the vehicle 700 is malfunctioning, the server(s) 778 may transmit a signal to the vehicle 700 instructing a fail-safe computer of the vehicle 700 to assume control, notify the passengers, and complete a safe parking maneuver.

For inferencing, the server(s) 778 may include the GPU(s) 784 and one or more programmable inference accelerators (e.g., NVIDIA's Tensor®). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 8:
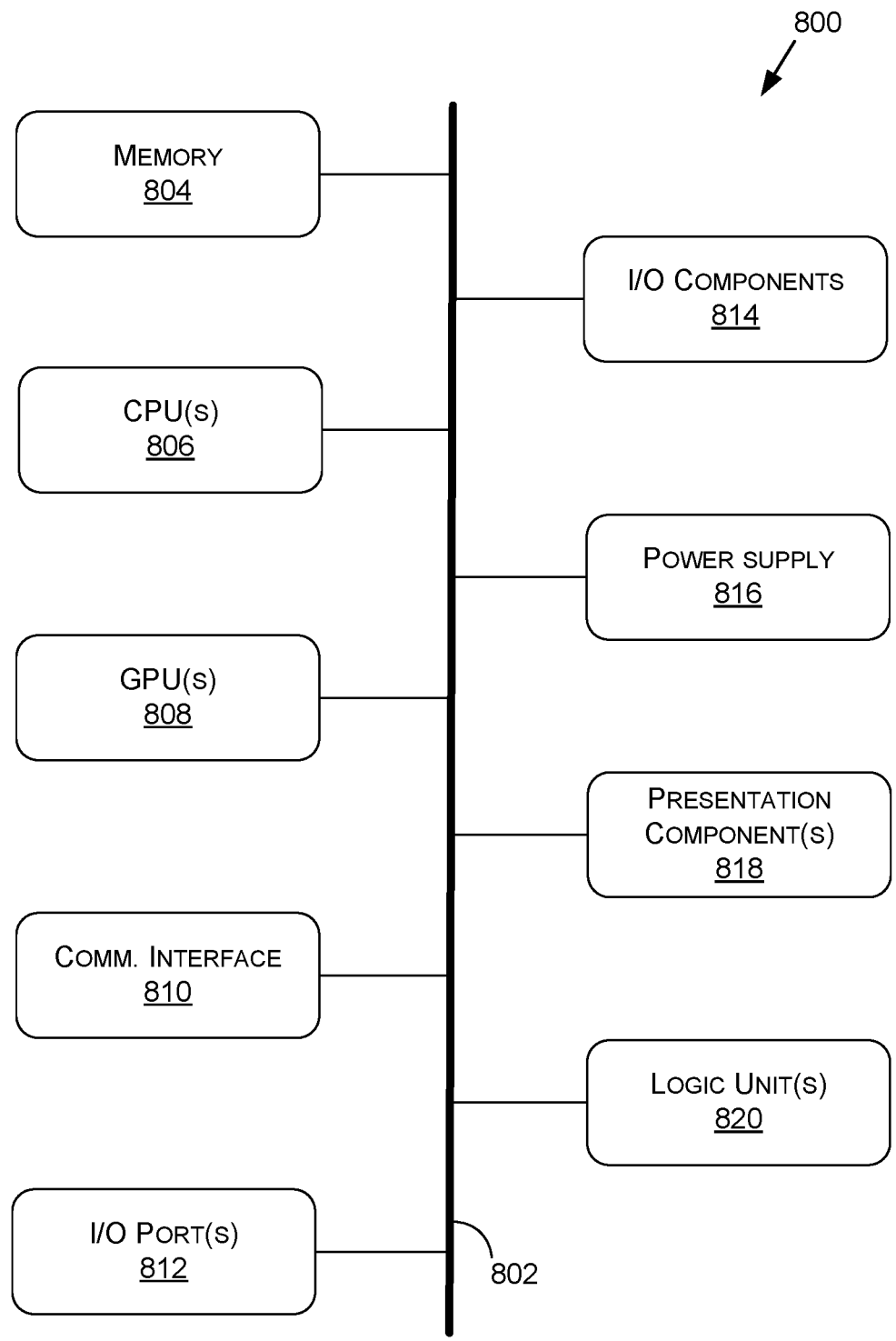
FIG. 8 is a block diagram of an example computing device suitable for use in implementing some embodiments of the present disclosure.

FIG. 8 is a block diagram of an example computing device(s) 800 suitable for use in implementing some embodiments of the present disclosure. Computing device 800 may include an interconnect system 802 that directly or indirectly couples the following devices: memory 804, one or more central processing units (CPUs) 806, one or more graphics processing units (GPUs) 808, a communication interface 810, input/output (I/O) ports 812, input/output components 814, a power supply 816, one or more presentation components 818 (e.g., display(s)), and one or more logic units 820. In at least one embodiment, the computing device(s) 800 may comprise one or more virtual machines (VMs), and/or any of the components thereof may comprise virtual components (e.g., virtual hardware components). For non-limiting examples, one or more of the GPUs 808 may comprise one or more vGPUs, one or more of the CPUs 806 may comprise one or more vCPUs, and/or one or more of the logic units 820 may comprise one or more virtual logic units. As such, a computing device(s) 800 may include discrete components (e.g., a full GPU dedicated to the computing device 800), virtual components (e.g., a portion of a GPU dedicated to the computing device 800), or a combination thereof.

Although the various blocks of FIG. 8 are shown as connected via the interconnect system 802 with lines, this is not intended to be limiting and is for clarity only. For example, in some embodiments, a presentation component 818, such as a display device, may be considered an I/O component 814 (e.g., if the display is a touch screen). As another example, the CPUs 806 and/or GPUs 808 may include memory (e.g., the memory 804 may be representative of a storage device in addition to the memory of the GPUs 808, the CPUs 806, and/or other components). In other words, the computing device of FIG. 8 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 8.

The interconnect system 802 may represent one or more links or busses, such as an address bus, a data bus, a control bus, or a combination thereof. The interconnect system 802 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 806 may be directly connected to the memory 804. Further, the CPU 806 may be directly connected to the GPU 808. Where there is direct, or point-to-point connection between components, the interconnect system 802 may include a PCIe link to carry out the connection. In these examples, a PCI bus need not be included in the computing device 800.

The memory 804 may include any of a variety of computer-readable media. The computer-readable media may be any available media that may be accessed by the computing device 800. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 804 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 800. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 806 may be configured to execute at least some of the computer-readable instructions to control one or more components of the computing device 800 to perform one or more of the methods and/or processes described herein. The CPU(s) 806 may each include one or more cores (e.g., one, two, four, eight, twenty-eight, seventy-two, etc.) that are capable of handling a multitude of software threads simultaneously. The CPU(s) 806 may include any type of processor, and may include different types of processors depending on the type of computing device 800 implemented (e.g., processors with fewer cores for mobile devices and processors with more cores for servers). For example, depending on the type of computing device 800, the processor may be an Advanced RISC Machines (ARM) processor implemented using Reduced Instruction Set Computing (RISC) or an x86 processor implemented using Complex Instruction Set Computing (CISC). The computing device 800 may include one or more CPUs 806 in addition to one or more microprocessors or supplementary co-processors, such as math co-processors.

In addition to or alternatively from the CPU(s) 806, the GPU(s) 808 may be configured to execute at least some of the computer-readable instructions to control one or more components of the computing device 800 to perform one or more of the methods and/or processes described herein. One or more of the GPU(s) 808 may be an integrated GPU (e.g., with one or more of the CPU(s) 806 and/or one or more of the GPU(s) 808 may be a discrete GPU. In embodiments, one or more of the GPU(s) 808 may be a coprocessor of one or more of the CPU(s) 806. The GPU(s) 808 may be used by the computing device 800 to render graphics (e.g., 3D graphics) or perform general purpose computations. For example, the GPU(s) 808 may be used for General-Purpose computing on GPUs (GPGPU). The GPU(s) 808 may include hundreds or thousands of cores that are capable of handling hundreds or thousands of software threads simultaneously. The GPU(s) 808 may generate pixel data for output images in response to rendering commands (e.g., rendering commands from the CPU(s) 806 received via a host interface). The GPU(s) 808 may include graphics memory, such as display memory, for storing pixel data or any other suitable data, such as GPGPU data. The display memory may be included as part of the memory 804. The GPU(s) 808 may include two or more GPUs operating in parallel (e.g., via a link). The link may directly connect the GPUs (e.g., using NVLINK) or may connect the GPUs through a switch (e.g., using NVSwitch). When combined together, each GPU 808 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 806 and/or the GPU(s) 808, the logic unit(s) 820 may be configured to execute at least some of the computer-readable instructions to control one or more components of the computing device 800 to perform one or more of the methods and/or processes described herein. In embodiments, the CPU(s) 806, the GPU(s) 808, and/or the logic unit(s) 820 may discretely or jointly perform any combination of the methods, processes and/or portions thereof. One or more of the logic units 820 may be part of and/or integrated in one or more of the CPU(s) 806 and/or the GPU(s) 808 and/or one or more of the logic units 820 may be discrete components or otherwise external to the CPU(s) 806 and/or the GPU(s) 808. In embodiments, one or more of the logic units 820 may be a coprocessor of one or more of the CPU(s) 806 and/or one or more of the GPU(s) 808.

Examples of the logic unit(s) 820 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 810 may include one or more receivers, transmitters, and/or transceivers that enable the computing device 800 to communicate with other computing devices via an electronic communication network, included wired and/or wireless communications. The communication interface 810 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 820 and/or communication interface 810 may include one or more data processing units (DPUs) to transmit data received over a network and/or through interconnect system 802 directly to (e.g., a memory of) one or more GPU(s) 808.

The I/O ports 812 may enable the computing device 800 to be logically coupled to other devices including the I/O components 814, the presentation component(s) 818, and/or other components, some of which may be built in to (e.g., integrated in) the computing device 800. Illustrative I/O components 814 include a microphone, mouse, keyboard, joystick, game pad, game controller, satellite dish, scanner, printer, wireless device, etc. The I/O components 814 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 800. The computing device 800 may be include depth cameras, such as stereoscopic camera systems, infrared camera systems, RGB camera systems, touchscreen technology, and combinations of these, for gesture detection and recognition. Additionally, the computing device 800 may include accelerometers or gyroscopes (e.g., as part of an inertia measurement unit (IMU)) that enable detection of motion. In some examples, the output of the accelerometers or gyroscopes may be used by the computing device 800 to render immersive augmented reality or virtual reality.

The power supply 816 may include a hard-wired power supply, a battery power supply, or a combination thereof. The power supply 816 may provide power to the computing device 800 to enable the components of the computing device 800 to operate.

The presentation component(s) 818 may include a display (e.g., a monitor, a touch screen, a television screen, a heads-up-display (HUD), other display types, or a combination thereof), speakers, and/or other presentation components. The presentation component(s) 818 may receive data from other components (e.g., the GPU(s) 808, the CPU(s) 806, DPUs, etc.), and output the data (e.g., as an image, video, sound, etc.).

Example Data Center

Figure 9:
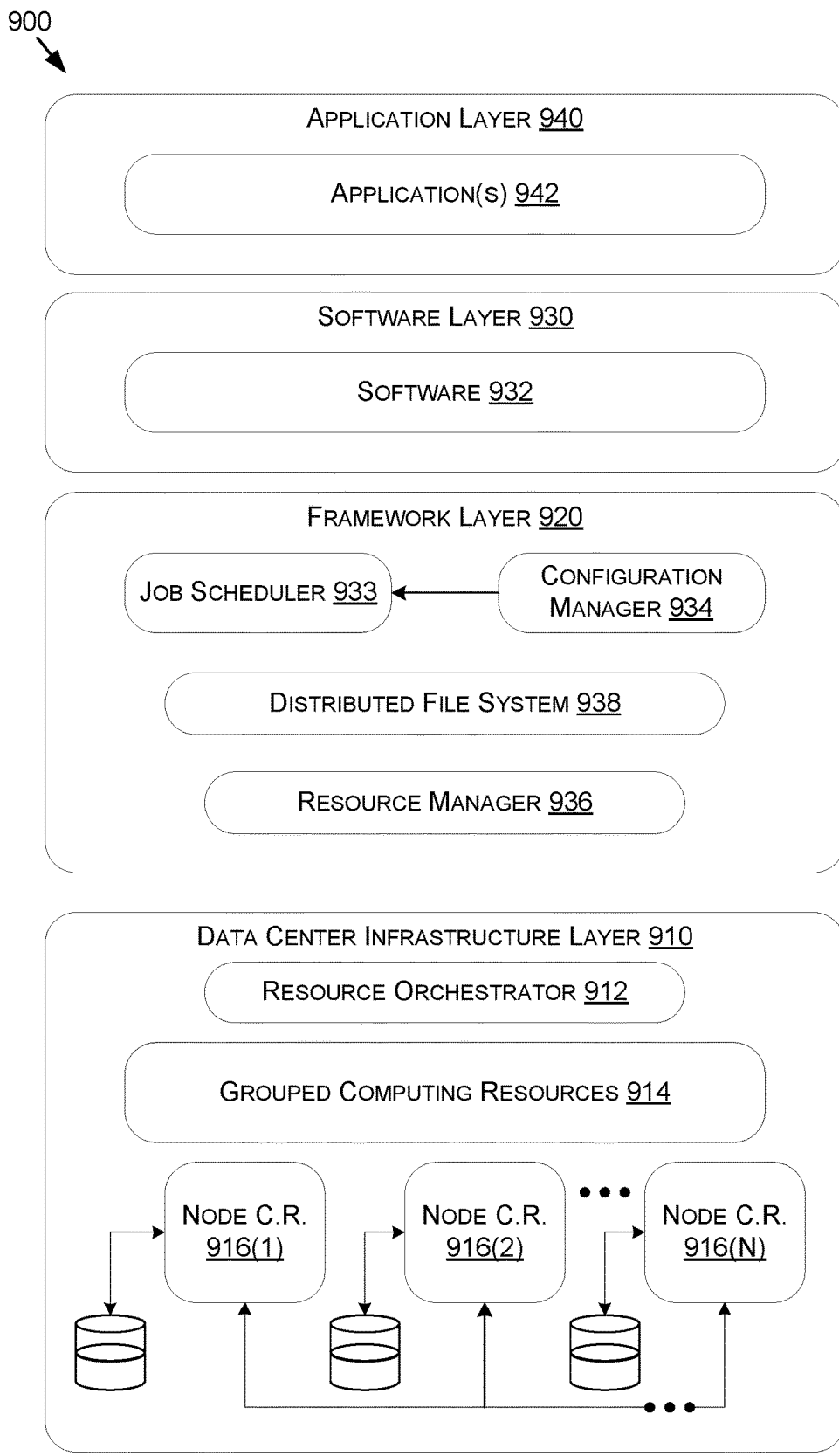
FIG. 9 is a block diagram of an example data center suitable for use in implementing some embodiments of the present disclosure.

FIG. 9 illustrates an example data center 900 that may be used in at least one embodiments of the present disclosure. The data center 900 may include a data center infrastructure layer 910, a framework layer 920, a software layer 930, and/or an application layer 940.

As shown in FIG. 9, the data center infrastructure layer 910 may include a resource orchestrator 912, grouped computing resources 914, and node computing resources ("node C.R.s") 916(1)-916(N), where "N" represents any whole, positive integer. In at least one embodiment, node C.R.s 916(1)-916(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 916(1)-916(N) may correspond to a server having one or more of the above-mentioned computing resources. In addition, in some embodiments, the node C.R.s 916(1)-9161(N) may include one or more virtual components, such as vGPUs, vCPUs, and/or the like, and/or one or more of the node C.R.s 916(1)-916(N) may correspond to a virtual machine (VM).

In at least one embodiment, grouped computing resources 914 may include separate groupings of node C.R.s 916 housed within one or more racks (not shown), or many racks housed in data centers at various geographical locations (also not shown). Separate groupings of node C.R.s 916 within grouped computing resources 914 may include grouped compute, network, memory or storage resources that may be configured or allocated to support one or more workloads. In at least one embodiment, several node C.R.s 916 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 912 may configure or otherwise control one or more node C.R.s 916(1)-916(N) and/or grouped computing resources 914. In at least one embodiment, resource orchestrator 912 may include a software design infrastructure (SDI) management entity for the data center 900. The resource orchestrator 912 may include hardware, software, or some combination thereof.

In at least one embodiment, as shown in FIG. 9, framework layer 920 may include a job scheduler 933, a configuration manager 934, a resource manager 936, and/or a distributed file system 938. The framework layer 920 may include a framework to support software 932 of software layer 930 and/or one or more application(s) 942 of application layer 940. The software 932 or application(s) 942 may respectively include web-based service software or applications, such as those provided by Amazon Web Services, Google Cloud and Microsoft Azure. The framework layer 920 may be, but is not limited to, a type of free and open-source software web application framework such as Apache Spark™ (hereinafter "Spark") that may utilize distributed file system 938 for large-scale data processing (e.g., "big data"). In at least one embodiment, job scheduler 933 may include a Spark driver to facilitate scheduling of workloads supported by various layers of data center 900. The configuration manager 934 may be capable of configuring different layers such as software layer 930 and framework layer 920 including Spark and distributed file system 938 for supporting large-scale data processing. The resource manager 936 may be capable of managing clustered or grouped computing resources mapped to or allocated for support of distributed file system 938 and job scheduler 933. In at least one embodiment, clustered or grouped computing resources may include grouped computing resource 914 at data center infrastructure layer 910. The resource manager 936 may coordinate with resource orchestrator 912 to manage these mapped or allocated computing resources.

In at least one embodiment, software 932 included in software layer 930 may include software used by at least portions of node C.R.s 916(1)-916(N), grouped computing resources 914, and/or distributed file system 938 of framework layer 920. One or more types of software may include, but are not limited to, Internet web page search software, e-mail virus scan software, database software, and streaming video content software.

In at least one embodiment, application(s) 942 included in application layer 940 may include one or more types of applications used by at least portions of node C.R.s 916(1)-916(N), grouped computing resources 914, and/or distributed file system 938 of framework layer 920. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 934, resource manager 936, and resource orchestrator 912 may implement any number and type of self-modifying actions based on any amount and type of data acquired in any technically feasible fashion. Self-modifying actions may relieve a data center operator of data center 900 from making possibly bad configuration decisions and possibly avoiding underutilized and/or poor performing portions of a data center.

The data center 900 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 900. In at least one embodiment, trained or deployed machine learning models corresponding to one or more neural networks may be used to infer or predict information using resources described above with respect to the data center 900 by using weight parameters calculated through one or more training techniques, such as but not limited to those described herein.

In at least one embodiment, the data center 900 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 800 of FIG. 8—e.g., each device may include similar components, features, and/or functionality of the computing device(s) 800. In addition, where backend devices (e.g., servers, NAS, etc.) are implemented, the backend devices may be included as part of a data center 900, an example of which is described in more detail herein with respect to FIG. 9.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 800 described herein with respect to FIG. 8. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
   receiving image data representative of an image generated using one or more sensors of a machine in an environment;
   receiving user input indicating at least one set of image space coordinates associated with the image;
   projecting the at least one set of image space coordinates to at least one set of three-dimensional (3D) machine space coordinates associated with the machine;
   determining one or more first sets of 3D world space coordinates based at least on a temporal correlation with the at least one set of 3D machine space coordinates;
   transforming the at least one set of 3D machine space coordinates to one or more second sets of 3D world space coordinates based at least on offsetting the at least one set of 3D machine space coordinates using the one or more first sets of world space coordinates; and
   updating one or more parameters of a machine learning model using ground truth data corresponding to the one or more second sets of 3D world space coordinates.

2. The method of claim 1, wherein the user input corresponds to a selection of one or more points on a line overlaid on the image in a user interface.

3. The method of claim 1, wherein the projecting is based at least on one or more positions of the one or more sensors relative to one or more points on the machine.

4. The method of claim 1, wherein a first set of the at least one set of image space coordinates corresponds to a first boundary of a lane depicted in the image and a second set of the at least one set of image space coordinates corresponds to a second boundary of the lane depicted in the image.

5. The method of claim 1, wherein the image is a first image and the method further comprises:
determining the at least one set of image space coordinates based at least on a set of image space coordinates selected in a user interface using a second image that temporally precedes the first image, and the user input corresponds to a confirmation of the at least one set of image space coordinates.

6. The method of claim 1, wherein the one or more second sets of 3D world space coordinates identify a first lane line and a second lane line and the method further comprises:
computing a centerline between the first lane line and the second lane line using the one or more second sets of 3D world space coordinates, wherein at least portion of the ground truth data identifies the centerline.

7. The method of claim 1, wherein the determining of the one or more first sets of 3D world space coordinates is based at least on one or more timestamps associated with the one or more first sets of 3D world space coordinates and the image.

8. The method of claim 1, wherein the one or more first sets of 3D world space coordinates were generated based at least on measuring one or more properties of the machine in association with generating the image data.

9. The method of claim 1, wherein the machine comprises a vehicle and the machine learning model is trained to control one or more vehicle operations using the ground truth data.

10. A system comprising:
one or more processing units to execute operations comprising:
receiving image data representative of an image generated using one or more sensors of a vehicle having a trajectory in world space;
determining a first set of coordinates in an image space associated with the image;
projecting the first set of coordinates to a first set of three-dimensional (3D) coordinates in a vehicle space associated with the vehicle;
determining an offset between the vehicle space and the world space based at least based on correlating the trajectory of the vehicle with the first set of 3D coordinates;
determining a second set of 3D coordinates in the world space based at least on applying the offset to the first set of 3D coordinates; and
updating one or more parameters of a machine learning model using ground truth data corresponding to the second set of 3D coordinates.

11. The system of claim 10, the one or more sensors of the vehicle includes a front-facing camera.

12. The system of claim 10, wherein the ground truth data includes 3D ground truth lane boundaries.

13. The system of claim 10, wherein the second set of 3D coordinates are used to compute a ground truth trajectory for the machine learning model.

14. The system of claim 10, wherein the trajectory comprises one or more sets of coordinates, the one or more sets of coordinates being determined using measurements associated with the vehicle, and the correlating comprises correlating the first set of 3D coordinates with at least one set of the one or more sets of coordinates of the trajectory.

15. A at least one processor comprising:
one or more circuits to determine a set of three-dimensional (3D) machine space coordinates associated with a machine using a set of image space coordinates, transform the set of 3D machine space coordinates to a first set of world space coordinates based at least on a second set of 3D world space coordinates associated with the set of 3D machine space coordinates, and update one or more parameters of a machine learning model using ground truth data corresponding to the second set of 3D world space coordinates.

16. The at least one processor of claim 15, wherein the processor is part of one or more of:
a control system for an autonomous or semi-autonomous machine;
a perception system for an autonomous or semi-autonomous machine;
a system for performing simulation operations;
a system for performing deep learning operations;
a system for generating synthetic data;
a system for generating multi-dimensional assets using a collaborative content platform;
a system implemented using an edge device;
a system implemented using a robot;
a system incorporating one or more virtual machines (VMs);
a system implemented at least partially in a data center; or
a system implemented at least partially using cloud computing resources.

17. The at least one processor of claim 15, wherein the set of image space coordinates correspond to an image generated using sensor data from one or more of:
a long-range camera;
a stereo camera;
an infrared camera;
a surround camera;
a wide view camera;
a mid-range camera;
a LIDAR sensor;
an ultrasonic sensor;
an infrared sensor; or
a radar sensor.

18. The at least one processor of claim 15, wherein the machine learning model is trained to control one or more vehicle operations using the ground truth data.

19. The at least one processor of claim 15, wherein the ground truth data identifies to at least one lane line in the world space.

20. The at least one processor of claim 15, wherein the transforming includes offsetting the set of 3D machine space coordinates using the second set of 3D world space coordinates.

* * * * *